United States Patent
Chen et al.

(10) Patent No.: US 11,102,825 B2
(45) Date of Patent: Aug. 24, 2021

(54) METHOD AND DEVICE FOR RESPONDING TO RANDOM ACCESS

(71) Applicant: CHINA ACADEMY OF TELECOMMUNICATIONS TECHNOLOGY, Beijing (CN)

(72) Inventors: Li Chen, Beijing (CN); Yali Zhao, Beijing (CN); Fangli Xu, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/476,050

(22) PCT Filed: Feb. 12, 2018

(86) PCT No.: PCT/CN2018/076489
§ 371 (c)(1),
(2) Date: Jul. 3, 2019

(87) PCT Pub. No.: WO2018/127240
PCT Pub. Date: Jul. 12, 2018

(65) Prior Publication Data
US 2019/0335515 A1   Oct. 31, 2019

(30) Foreign Application Priority Data

Jan. 6, 2017 (CN) .......................... 201710009612.0

(51) Int. Cl.
*H04W 74/08* (2009.01)
*H04W 76/18* (2018.01)
(Continued)

(52) U.S. Cl.
CPC ......... *H04W 74/0858* (2013.01); *H04L 69/22* (2013.01); *H04W 72/085* (2013.01); *H04W 76/11* (2018.02); *H04W 76/18* (2018.02)

(58) Field of Classification Search
CPC . H04W 74/0858; H04W 76/18; H04W 76/11; H04W 72/085; H04W 76/10; H04W 76/19; H04W 74/0833; H04L 69/22
See application file for complete search history.

(56) References Cited

U.S. PATENT DOCUMENTS

2010/0085926 A1\* 4/2010 Harada ............... H04W 28/065
370/329
2010/0278131 A1   11/2010 Jeong et al.
(Continued)

FOREIGN PATENT DOCUMENTS

CN   102067704 A   5/2011
CN   102469617 A   5/2012
(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)," 3GPP TS 36.321 V12.9.0, Mar. 2016, pp. 1-77 (Year: 2016).\*

(Continued)

*Primary Examiner* — Un C Cho
*Assistant Examiner* — Lalita W Pace
(74) *Attorney, Agent, or Firm* — Ladas & Parry, LLP

(57) ABSTRACT

The present disclosure relates to a method and a device for responding to a random access. The method includes: a user equipment (UE) sending a random access request, wherein information including a UE identifier is carried in the random access request; and the UE receiving a random access response, wherein when UE identifier carried in the random access response is consistent with the UE identifier in the random access request, a contention resolution is completed; when the UE identifier carried in the random access response is inconsistent with the UE identifier in the (Continued)

random access request, the UE determines that the random access fails this time, and re-initiates a random access attempt; and when no UE identifier is carried in the random access response, the UE falls back to a random access process in which no UE identifier information is carried in the random access request.

22 Claims, 11 Drawing Sheets

(51) Int. Cl.
*H04W 76/11* (2018.01)
*H04L 29/06* (2006.01)
*H04W 72/08* (2009.01)

(56) References Cited

U.S. PATENT DOCUMENTS

| | | | | |
|---|---|---|---|---|
| 2013/0003586 | A1* | 1/2013 | Tajima | H04W 74/08 370/252 |
| 2014/0092855 | A1* | 4/2014 | Ahn | H04W 74/006 370/329 |
| 2015/0023281 | A1 | 1/2015 | Wu | |
| 2016/0073292 | A1* | 3/2016 | Fan | H04W 74/006 370/230 |
| 2017/0034853 | A1* | 2/2017 | Rune | H04W 4/70 |
| 2017/0094688 | A1* | 3/2017 | Lee | H04W 48/12 |
| 2017/0223744 | A1* | 8/2017 | Qian | H04W 16/28 |
| 2017/0280483 | A1* | 9/2017 | Liu | H04L 1/08 |
| 2018/0103465 | A1* | 4/2018 | Agiwal | H04W 72/0413 |
| 2018/0184439 | A1 | 6/2018 | Lee et al. | |
| 2018/0279375 | A1* | 9/2018 | Jeon | H04W 74/0833 |
| 2018/0279376 | A1* | 9/2018 | Dinan | H04W 74/0833 |
| 2019/0075598 | A1* | 3/2019 | Li | H04W 76/11 |
| 2019/0289544 | A1 | 9/2019 | Yi et al. | |
| 2019/0350000 | A1* | 11/2019 | Zhang | H04W 72/0406 |
| 2019/0357267 | A1* | 11/2019 | Martin | H04W 74/0833 |

FOREIGN PATENT DOCUMENTS

| | | |
|---|---|---|
| CN | 104205670 A | 12/2014 |
| CN | 2016208962 A1 | 12/2016 |

OTHER PUBLICATIONS

Ericsson et al., "KT PyeongChang 5G Special Interest Group (KT 5G-SIG); KT 5th Generation Radio Access; Medium Access Control (MAC); Protocol specification (Release 1)," TS 5G.321 V1.2, Sep. 2016, pp. 1-42 (Year: 2016).*
First Office Action from CN app. No. 201710009612.0, dated Jan. 2, 2019, with English translation from Global Dossier.
Written Opinion of the International Searching Authority and International Search Report from PCT.CN2018/076489, dated May 4, 2018, with English translation from WIPO.
International Preliminary Report on Patentability, dated Jul. 9, 2019, with English translation from WIPO.
"On 2-step RACH procedure in NR", R1-1611274, 3GPP TSG RAN WG1 Meeting #87, Reno, USA, Nov. 14-18, 2016.
"Considerations on NR RACH procedures", R2-168013, 3GPP TSG RAN WG2 Meeting #96, Reno, USA, Nov. 14-18, 2016.

* cited by examiner

| T1=1 | T2=0 | Temporary C-RNTI | Oct 1 |
|---|---|---|---|
| | | Temporary C-RNTI | Oct 2 |
| T C-RNTI | | Contention Resolution Identity | Oct 3 |
| Contention Resolution Identity | | | |
| Contention Resolution Identity | | | |
| Contention Resolution Identity | | | |
| Contention Resolution Identity | | | |
| Contention Resolution Identity | | | Oct 8 |

Fig. 11b

| T1=1 | T2=1 | Timing Advance Command | Oct 1 |
|---|---|---|---|
| Timing Advance Command | | UL Grant | Oct 2 |
| UL Grant | | | Oct 3 |
| UL Grant | | | Oct 4 |
| UL Grant | Contention Resolution Identity | | Oct 5 |
| Contention Resolution Identity | | | Oct 6 |
| Contention Resolution Identity | R | | Oct 7 |
| R | | | Oct 8 |

Fig. 11c

| T1 | Timing Advance Command | Oct 1 |
|---|---|---|
| Timing Advance Command | UL Grant | Oct 2 |
| UL Grant | | Oct 3 |
| UL Grant | | |
| Temporary C-RNTI | | |
| Temporary C-RNTI | | |
| T2 | Contention Resolution Identity | |
| Contention Resolution Identity | | |
| Contention Resolution Identity | | |
| Contention Resolution Identity | | |
| Contention Resolution Identity | | |
| Contention Resolution Identity | | Oct 12 |

Fig. 12

| T1 | R | UL Grant | Oct 1 |
|---|---|---|---|
| UL Grant ||| Oct 2 |
| UL Grant ||| Oct 3 |
| Temporary C-RNTI ||||
| Temporary C-RNTI ||||
| Contention Resolution Identity ||||
| Contention Resolution Identity ||||
| Contention Resolution Identity ||||
| Contention Resolution Identity ||||
| Contention Resolution Identity ||||
| Contention Resolution Identity ||| Oct 11 |

Fig. 13e

| T1 | Temporary C-RNTI | Oct 1 |
|---|---|---|
| Temporary C-RNTI || Oct 2 |
| TC-RNTI | Contention Resolution Identity | Oct 3 |
| Contention Resolution Identity |||
| Contention Resolution Identity |||
| Contention Resolution Identity |||
| Contention Resolution Identity |||
| Contention Resolution Identity || Oct 8 |

Fig. 13f

| T1 | Contention Resolution Identity | Oct 1 |
|---|---|---|
| Contention Resolution Identity || Oct 2 |
| Contention Resolution Identity || Oct 3 |
| Contention Resolution Identity |||
| Contention Resolution Identity |||
| Contention Resolution Identity || Oct 6 |

Fig. 13g

| T1=1 | T2=0 | Temporary C-RNTI | Oct 1 |
|---|---|---|---|
| | | Temporary C-RNTI | Oct 2 |
| T C-RNTI | | Contention Resolution Identity | Oct 3 |
| Contention Resolution Identity | | | |
| Contention Resolution Identity | | | |
| Contention Resolution Identity | | | |
| Contention Resolution Identity | | | |
| Contention Resolution Identity | | | Oct 8 |

Fig. 14c

| T1=1 | T2=1 | Timing Advance Command | | Oct 1 |
|---|---|---|---|---|
| Timing Advance Command | | | UL Grant | Oct 2 |
| UL Grant | | | | Oct 3 |
| UL Grant | | | | Oct 4 |
| UL Grant | Contention Resolution Identity | | | Oct 5 |
| Contention Resolution Identity | | | | Oct 6 |
| Contention Resolution Identity | | | R | Oct 7 |
| R | | | | Oct 8 |

Fig. 14d

| E | T | RAPID | Oct 1 |
|---|---|---|---|

Fig. 15a

METHOD AND DEVICE FOR RESPONDING TO RANDOM ACCESS

CROSS-REFERENCE TO RELATED APPLICATIONS

This application is the U.S. national phase of PCT/CN2018/076489 filed on Feb. 12, 2018 which claims a priority to Chinese Patent Application No. 201710009612.0 filed in China on Jan. 6, 2017, the disclosures of which are incorporated by reference herein in their entireties.

TECHNICAL FIELD

The present disclosure relates to the technical field of communications, and in particular to a method and a device for responding to a random access.

BACKGROUND

The random access of the LTE system includes two types: a contention random access and a non-contention random access, processes of which are described as follows.

A process of contention random access is shown in FIG. 1, which mainly includes a four-step random access, also called 4-step RA.

Msg1: a user equipment (UE) selects a random access preamble and a physical random access channel (PRACH) resource, and sends the selected random access preamble to a base station by using the PRACH resource.

Msg2: the base station receives the preamble and sends a random access response. The random access response includes two parts: an MAC header and MAC RARs. The MAC header contains multiple sub-headers. A format of each sub-header is shown in FIG. 2, and its main content is RAPID (random access preamble ID). As shown in FIG. 3, the MAC RAR includes a Timing Advance Command (TAC), an uplink resource grant (UL Grant, uplink scheduling grant) for Msg3, and a temporary C-RNTI allocated by the network side. The Physical Downlink Control Channel (PDCCH) carrying Msg2 scheduling information is scrambled by the RA-RNTI, and the RA-RNTI uniquely corresponds to the time-frequency resource for transmitting Msg1 within a window length for the UE to receive Msg2. When receiving Msg2, the UE determines that the Msg2 corresponds to Msg1 sent by the UE, according to the RA-RNTI and the preamble ID.

Msg3: the UE sends an uplink transmission on the UL grant specified in Msg2. The contents of Msg3 uplink transmission are different for different random access reasons. For example, for an initial access, an RRC connection establishment request is transmitted in Msg3.

Msg4: a contention resolution message; the UE may determine whether the random access is successful according to Msg4. For an initial access UE, after the contention resolution is successful, the temporary C-RNTI is automatically converted into a unique UE identifier of UE in the cell.

A process of non-contention random access is shown in FIG. 4, which mainly includes three steps.

Msg0: the base station allocates a dedicated preamble for non-contention random access and a PRACH resource used for random access for the UE.

Msg1: the UE sends the designated dedicated preamble to the base station on the designated PRACH resource according to the indication of Msg0. After receiving Msg1, the base station calculates the uplink timing advance TA according to Msg1.

Msg2: the base station sends a random access response to the UE. The random access response includes information of timing advance, a subsequent uplink transmission resource and an allocated UL grant, and the timing advance is used for the timing relationship of subsequent uplink transmission of the UE.

In a new generation radio network system, for a scenario where the UE side and the gNB do not need to be synchronized, a two-step random access process (or called 2-step RA) is realized on the basis of 4-step RA, and the process is shown in FIG. 5. For ease of expression, Msg1, Msg2 are no longer used, but are called step1, step2 hereinafter.

Step 1: which is equivalent to Msg1+Msg3 in 4-step RA, and contains a random access code part and a data part, and the two parts may be decoded independently. The random access code part is configured to send a preamble, which is the random access preamble of Msg1 in 4-step RA; the data part is similar to Msg3 in 4-step RA, and may include the UE identifier (the specific contents of UE identifier may be different according to different random access events and UE statuses), the buffer status report (BSR, or DV, Data Volume), a PHR (Power Headroom Report), and uplink data.

Step 2: which is equivalent to Msg2+Msg4 in 4-step RA, and is configured to complete random access contention resolution and uplink data reception and feedback.

The two-step random access (2-step RA) is introduced into the 5G system, and the random access response message in the random access process in the related art is no longer applicable to 2-step RA.

SUMMARY

In view of the above technical problems, embodiments of the present disclosure provide a method and a device for responding to a random access, so as to solve the problem of how to design random access response in a new generation radio communication system (NR system or 5G system) to meet the characteristics and requirements of the random access process of the new generation radio communication system.

In a first aspect, a method for responding to a random access is provided according to an embodiment of the present disclosure, which includes:

a user equipment (UE) sending a random access request, wherein information including a UE identifier is carried in the random access request; and the UE receiving a random access response, wherein when UE identifier carried in the random access response is consistent with the UE identifier in the random access request, a contention resolution is completed; when the UE identifier carried in the random access response is inconsistent with the UE identifier in the random access request, the UE determines that the random access fails this time, and re-initiates a random access attempt; and when no UE identifier is carried in the random access response, the UE falls back to a random access process in which no UE identifier information is carried in the random access request;

wherein the random access response is adaptively generated by a network side in response to the random access request.

A random access in which the UE identifier is carried in the random access request is called a two-step random access, while a random access in which no UE identifier is carried in the random access request is called a four-step random access.

Optionally, the random access response is sent by using a medium access control protocol data unit (MAC PDU), the MAC PDU includes a MAC header and MAC RARs, the MAC header includes multiple MAC sub-headers, each MAC sub-header includes a random access preamble identifier (RAPID), which corresponds to a random access preamble in the random access request, each MAC sub-header corresponds to one MAC RAR, and a random access response MAC RAR carrying the UE identifier and a random access response MAC RAR carrying no UE identifier are multiplexed into one MAC PDU.

Optionally, for a four-step random access, a two-step random access and different random access scenarios for the two-step random access, MAC RARs with the same length are used, and the length of MAC RAR is fixed to be capable of including a maximum UE identifier length and a temporary cell radio network temporary identifier (Temporary C-RNTI), or to be capable of including a maximum UE identifier length, a Temporary C-RNTI and an uplink scheduling grant (UL Grant).

Optionally, the MAC RAR includes any one or more of the following:

T1: which indicates a MAC RAR of a four-step random access or a MAC RAR of a two-step random access is subsequent;

T2: which appears only in the MAC RAR of a two-step random access, and is used to indicate a long UE ID or a short UE ID;

Timing Advance Command: uplink timing advance;

UL Grant: resource allocation for subsequent uplink transmission;

Temporary C-RNTI: which is to be converted into a C-RNTI allocated for the UE after the contention resolution is completed;

Contention Resolution Identity: UE identifier information included in the random access request corresponding to two-step random access; and R: reserved bits.

Optionally, the MAC RAR includes all possible fields, each of which has a maximum value of possible lengths, and the length of each field is fixed; and if the field is not needed in the random access response, the field is actually reserved bits filled with a value specified in a protocol or a value determined by the network side.

Optionally, the UE sending a random access request includes:

the UE sending a preamble of the random access request, and not sending information carrying the UE identifier; and the UE receiving a random access response includes:

the UE receiving the random access response, and determining a MAC sub-header corresponding to the sent preamble according to the RAPID field in the MAC sub-header; and the UE acquiring a MAC RAR corresponding to the MAC sub-header; wherein when the indication field in the MAC RAR is analyzed to determine that no UE identifier is carried in the MAC RAR, the UE reads subsequent fields in the MAC RAR, and performs related operations according to the indications of the fields to complete the subsequent random access process; and when the indication field in the MAC RAR is analyzed to determine that the UE identifier is carried in the MAC RAR, the UE determines that the random access fails, and subsequently re-initiates a new random access attempt.

Optionally, the UE sending a random access request includes:

the UE sending the random access request, which includes a preamble and information including the UE identifier;

the UE receiving a random access response includes:

the UE receiving the random access response, and determining a MAC sub-header corresponding to the sent preamble according to the RAPID field in the MAC sub-header; and the UE acquiring a MAC RAR corresponding to the MAC sub-header; wherein when the indication field T1 in the MAC RAR is analyzed to determine that no UE identifier is carried in the MAC RAR, the UE determines that only the preamble is received by the network side and no data part is correctly received, reads the subsequent fields in the MAC RAR, falls back to the four-step random access, analyzes each field in the MAC RAR according to the four-step random access process, and then completes the subsequent random access process according to the indications of the fields in the MAC RAR; or when the indication field T1 in the MAC RAR is analyzed to determine that the UE identifier is carried in the MAC RAR, and the indication field T2 is analyzed to determine that the UE identifier is a long UE ID, and when the UE sends a long UE ID, the UE determines whether the UE identifier in the MAC RAR is consistent with the long UE ID sent by the UE; when the UE identifier in the MAC RAR is consistent with the long UE ID sent by the UE, the UE determines that a contention resolution is completed, the UE receives a physical downlink control channel (PDCCH) scheduling command with the Temporary C-RNTI subsequently sent by the network side, and sends an uplink transmission in response to the scheduling command; and when the UE identifier in the MAC RAR is inconsistent with the long UE ID sent by the UE, the UE determines that the random access fails this time, and subsequently re-initiates a random access attempt; or when the indication field T1 in the MAC RAR is analyzed to determine that the UE identifier is carried in the MAC RAR, and the indication field T2 is analyzed to determine that the UE identifier is a long UE ID, and when the UE sends a short UE ID, the UE determines that the MAC RAR is not for the UE itself and the random access fails this time, and the UE subsequently re-initiates a random access attempt; or when the indication field T1 in the MAC RAR is analyzed to determine that the UE identifier is carried in the MAC RAR, and the indication field T2 is analyzed to determine that the UE identifier is a short UE ID, and when the UE sends a long UE ID, the UE determines that the MAC RAR is not for the UE itself and the random access fails this time, and the UE subsequently re-initiates a random access attempt; or when the indication field T1 in the MAC RAR is analyzed to determine that the UE identifier is carried in the MAC RAR, and the indication field T2 is analyzed to determine that the UE identifier is a short UE ID, and when the UE sends a short UE ID, the UE determines whether the UE identifier in the MAC RAR is consistent with the short UE ID sent by the UE; when the UE identifier in the MAC RAR is consistent with the short UE ID sent by the UE, the UE determines a contention resolution is completed, the UE analyzes an UL Grant in the MAC RAR, and sends a subsequent uplink transmission according to a resource indicated by the UL Grant in the MAC RAR; and when the UE identifier in the MAC RAR is inconsistent with the short UE ID sent by the UE, the UE determines that the random access fails this time, and subsequently re-initiates a random access attempt.

Optionally, the UE sending a random access request includes:

the UE sending the random access request, which includes a preamble and information including a UE ID;

the UE receiving a random access response includes:

the UE receiving the random access response, and determining a MAC sub-header corresponding to the sent preamble according to the RAPID field in the MAC sub-header; and the UE acquiring a MAC RAR corresponding to the MAC sub-header; wherein when the indication field T1 in the MAC RAR is analyzed to determine that no UE identifier is carried in the MAC RAR, the UE determines that only the preamble is received by the network side and no data part is correctly received, the UE only analyzes the Timing Advance Command, UL Grant, and Temporary C-RNTI fields in the MAC RAR, falls back to the four-step random access, then adjusts an uplink timing advance according to the indications of the fields in the MAC RAR, acquires Temporary C-RNTI, sends Msg3 according to the UL Grant and completes the subsequent random access process; or when the indication field T1 in the MAC RAR is analyzed to determine that the UE identifier is carried in the MAC RAR, and the indication field T2 is analyzed to determine that the UE identifier is a long UE ID, the UE analyzes all fields; when the UE sends a long UE ID, the UE determines whether the UE identifier in the MAC RAR is consistent with the long UE ID sent by the UE; when the UE identifier in the MAC RAR is consistent with the long UE ID sent by the UE, the UE determines that a contention resolution is completed, then the UE sends a subsequent uplink transmission according to a resource indicated by the UL Grant in the MAC RAR; and when the UE identifier in the MAC RAR is inconsistent with the long UE ID sent by the UE, the UE determines that the random access fails this time, and subsequently re-initiates a random access attempt; or when the indication field T1 in the MAC RAR is analyzed to determine that the UE identifier is carried in the MAC RAR, and the indication field T2 is analyzed to determine that the UE identifier is a long UE ID, the UE analyzes all fields; and when the UE sends a short UE ID, the UE determines that the MAC RAR is not for the UE itself and the random access fails this time, and the UE subsequently re-initiates a random access attempt; or when the indication field T1 in the MAC RAR is analyzed to determine that the UE identifier is carried in the MAC RAR, and the indication field T2 is analyzed to determine that the UE identifier is a short UE ID, the UE analyzes all fields; when the UE sends a long UE ID, the UE determines that the MAC RAR is not for the UE itself and the random access fails this time, and the UE subsequently re-initiates a random access attempt; or when the indication field T1 in the MAC RAR is analyzed to determine that the UE identifier is carried in the MAC RAR, and the indication field T2 is analyzed to determine that the UE identifier is a short UE ID, the UE analyzes all fields; when the UE sends a short UE ID, the UE determines whether the UE identifier in the MAC RAR is consistent with the short UE ID sent by the UE; when the UE identifier in the MAC RAR is consistent with the short UE ID sent by the UE, the UE determines that a contention resolution is completed, then the UE sends a subsequent uplink transmission according to a resource indicated by the UL Grant in the MAC RAR; and when the UE identifier in the MAC RAR is inconsistent with the short UE ID sent by the UE, the UE determines that the random access fails this time, and subsequently re-initiates a random access attempt.

Optionally, the MAC sub-header includes a preamble ID and a length indication field L, and wherein the length indication field L is used to indicate a length or a type of corresponding MAC RAR.

Optionally, the type of MAC RAR includes any one or more of the following:

a four-step random access MAC RAR format 1: applicable to a scenario where the UE initiates a four-step contention random access;

a four-step random access MAC RAR format 2: applicable to a scenario where the UE initiates a four-step non-contention random access;

a four-step random access MAC RAR format 3: applicable to a scenario where the UE initiates a four-step non-contention random access, and the network side determines that the UE only needs to perform synchronization and does not need to send uplink data;

a two-step random access MAC RAR format 1: a radio resource control (RRC) connection establishment or RRC connection reestablishment on a common control channel CCCH or an inactive UE identifier (UE ID) is carried in the random access request, the network side needs to allocate C-RNTI for the UE, and the network side needs the UE to perform uplink synchronization calibration;

a two-step random access MAC RAR format 2: the RRC connection establishment or the RRC connection reestablishment on the CCCH channel or the inactive UE ID is carried in the random access request, the network side needs to allocate C-RNTI for the UE, and the network side does not need the UE to perform the uplink synchronization calibration;

a two-step random access MAC RAR format 3: the RRC connection establishment or the RRC connection reestablishment on the CCCH channel or the inactive UE ID is carried in the random access request, the network side needs to allocate C-RNTI for the UE, and the network side does not need the UE to perform the uplink synchronization calibration;

a two-step random access MAC RAR format 4: the inactive UE ID is carried in the random access request, and the network side only confirms that the data in the random access request is received, and does not need the UE to be in a connected state;

a two-step random access MAC RAR format 5: C-RNTI of the UE in the connected state is carried in the random access request, and the network side needs the UE to perform uplink synchronization calibration;

a two-step random access MAC RAR format 6: C-RNTI of the UE in the connected state is carried in the random access request, and the network side does not need the UE to perform uplink synchronization calibration; and a two-step random access MAC RAR format 7: C-RNTI of the UE in the connected state is carried in the random access request, the network side confirms that the data content in the random access request is correctly received, and determines that the UE does not need subsequent uplink transmission, and the network side does not allocate an UL Grant.

Optionally, the UE sending a random access request includes:

the UE sending a preamble of the random access request, and not sending information carrying a UE identifier; and the UE receiving a random access response includes:

the UE receiving the random access response, determining a MAC sub-header corresponding to the sent preamble according to the RAPID field in the MAC sub-header, and analyzing an L field in the MAC sub-header to determine a length or a type of subsequent MAC RAR;

wherein when the L field indicates the type of the MAC RAR of the two-step random access, the UE determines that the random access response is not for the UE itself and the random access fails, and the UE subsequently re-initiates a new random access attempt; and when the L field indicates the type of the MAC RAR of the four-step random access, the UE acquires the MAC RAR, and the UE completes the required subsequent random access process according to the indications of the fields of the MAC RAR.

Optionally, the UE sending a random access request includes:

the UE sending the random access request, which includes a preamble and a UE identifier; and the UE receiving a random access response includes:

the UE receiving the random access response, determining a MAC sub-header corresponding to the sent preamble according to the RAPID field in the MAC sub-header, and analyzing the L field in the MAC sub-header to determine a type of subsequent MAC RAR;

wherein when the MAC RAR type is a four-step random access RAR, the UE determines that the data part in the random access request is not correctly received by the network side, falls back to the four-step random access process, sends an Msg3 according to the MAC RAR indication, and receives a downlink transmission Msg4 to complete the contention resolution;

when the MAC RAR type is a two-step random access RAR, the following processing is performing according to different MAC RAR types indicated by the L field:

in a case that the format type is the two-step random access MAC RAR format 1, when a long UE ID is carried in the random access request, and the UE identifier in the MAC RAR is consistent with the long UE ID in the random access request, it is considered by the UE that the contention resolution is successful, and the UE performs uplink synchronization timing calibration, sends uplink data, and applies C-RNTI according to the indication in the MAC RAR; and when the UE sends a short UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 2, when a long UE ID is carried in the random access request, and the UE identifier in the MAC RAR is consistent with the long UE ID in the random access request, it is considered by the UE that the contention resolution is successful, and the UE sends uplink data and applies C-RNTI according to the indication in the MAC RAR; and when the UE sends a short UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 3, when a long UE ID is carried in the random access request, and the UE identifier in the MAC RAR is consistent with the long UE ID in the random access request, it is considered by the UE that the contention resolution is successful, and the UE applies C-RNTI according to the indication in the MAC RAR; and when the UE sends a short UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 4, when a long UE ID is carried in the random access request, and the UE identifier in the MAC RAR is consistent with the long UE ID in the random access request, it is considered by the UE that the contention resolution is successful, and the UE applies C-RNTI according to the indication in the MAC RAR, then receives a PDCCH scheduling command carrying the C-RNTI and sends uplink transmission in response to the scheduling command; and when the UE sends a short UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 5, when a short UE ID is carried in the random access request, and the UE identifier in the MAC RAR is consistent with the short UE ID in the random access request, it is considered by the UE that the contention resolution is successful, and the UE performs uplink synchronization timing calibration and sends uplink data according to the indication in the MAC RAR; and when the UE sends a long UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 6, when a short UE ID is carried in the random access request, and the UE identifier in the MAC RAR is consistent with the short UE ID in the random access request, it is considered by the UE that the contention resolution is successful, and the UE sends uplink data according to the indication in the MAC RAR; and when the UE sends a long UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 7, when a short UE ID is carried in the random access request, and the UE identifier in the MAC RAR is consistent with the short UE ID in the random access request, it is considered by the UE that the contention resolution is successful, then the UE monitors a PDCCH scheduling command carrying the C-RNTI, and once receiving a PDCCH scheduling command for scheduling uplink transmission, the UE sends uplink transmission in response to the scheduling command; and when the UE sends a long UE ID in the random access request or when the UE identifier in the MAC RAR is inconsistent with the UE identifier in the random access request, it is considered by the UE that the random access fails, and the UE subsequently re-initiates a random access attempt.

In a second aspect, an embodiment of the present disclosure provides a method for responding to a random access, which includes:

a network side receiving a random access request sent by a user equipment (UE), wherein information including a UE identifier is carried in the random access request; and the network side adaptively generating a random access response in response to the random access request, and sending the random access response to the UE, wherein if information including a UE identifier is carried in the random access request, the UE identifier is included in the random access response according to the two-step random access process; and if no information including a UE identifier is carried in the random access request, a random access response is generated according to the four-step random access.

Optionally, the random access response is sent by using a MAC PDU, the MAC PDU includes a MAC header and medium access control random access responses (MAC RARs), the MAC header includes multiple MAC sub-headers, each MAC sub-header includes a RAPID, which corresponds to a preamble in the random access request, each MAC sub-header corresponds to one MAC RAR, and a random access response MAC RAR carrying the UE identifier and a random access response MAC RAR carrying no UE identifier are multiplexed into one MAC PDU.

Optionally, for a four-step random access, a two-step random access and different random access scenarios for the two-step random access, MAC RARs with the same length are used, and the length of MAC RAR is fixed to be capable of including a maximum UE ID length and a Temporary C-RNTI, or to be capable of including a maximum UE ID length, a Temporary C-RNTI and an UL Grant.

Optionally, the MAC RAR includes any one or more of the following:

T1: which indicates a MAC RAR of a four-step random access or a MAC RAR of a two-step random access is subsequent;

T2: which appears only in the MAC RAR of a two-step random access, and is used to indicate a long UE ID or a short UE ID;

Timing Advance Command: uplink timing advance;

UL Grant: resource allocation for subsequent uplink transmission;

Temporary C-RNTI: which is to be converted into a C-RNTI allocated for the UE after the contention resolution is completed;

Contention Resolution Identity: UE identifier information included in the request corresponding to two-step random access; and R: reserved bits.

Optionally, the MAC RAR includes all possible fields, each of which has a maximum value of possible lengths, and the length of each field is fixed; and if the field is not needed in the random access response, the field is actually reserved bits filled with a value specified in a protocol or a value determined by the network side.

Optionally, the network side receiving a random access request sent by the UE includes:

the network side receiving the random access request, wherein the random access request includes a preamble and does not send information carrying the UE identifier; and the network side adaptively generating a random access response in response to the random access request includes:

the network side sending the random access response, wherein the random access response includes an uplink timing advance, an uplink transmission resource, and a Temporary C-RNTI configured for the UE according to the preamble.

Optionally, the network side receiving a random access request sent by the UE includes:

the network side receiving the random access request, wherein the random access request includes a preamble or includes a preamble and a data part; and the network side adaptively generating a random access response in response to the random access request includes:

the network side generating and sending a corresponding MAC RAR to the UE in response to the received random access request.

Optionally, when the indication field T1 in the generated MAC RAR determines that the UE identifier is carried in the MAC RAR, and the indication field T2 determines that the UE identifier is a long UE ID, the network side sends a PDCCH scheduling command that carries Temporary C-RNTI, and allocates subsequent uplink transmission resources for the UE.

Optionally, the MAC sub-header includes a preamble ID and a length indication field L, and wherein the length indication field L is used to indicate a length or a type of corresponding MAC RAR.

Optionally, the type of MAC RAR includes any one or more of the following:

a four-step random access MAC RAR format 1: applicable to a scenario where the UE initiates a four-step contention random access;

a four-step random access MAC RAR format 2: applicable to a scenario where the UE initiates a four-step non-contention random access;

a four-step random access MAC RAR format 3: applicable to a scenario where the UE initiates a four-step non-contention random access, and the network side determines that the UE only needs to perform synchronization and does not need to send uplink data;

a two-step random access MAC RAR format 1: a RRC connection establishment or RRC connection reestablishment on a CCCH or an inactive UE ID is carried in the random access request, the network side needs to allocate C-RNTI for the UE, and the network side needs the UE to perform uplink synchronization calibration;

a two-step random access MAC RAR format 2: the RRC connection establishment or the RRC connection reestablishment on the CCCH channel or the inactive UE ID is carried in the random access request, the network side needs to allocate C-RNTI for the UE, and the network side does not need the UE to perform the uplink synchronization calibration;

a two-step random access MAC RAR format 3: the RRC connection establishment or the RRC connection reestablishment on the CCCH channel or the inactive UE ID is carried in the random access request, the network side needs to allocate C-RNTI for the UE, and the network side does not need the UE to perform the uplink synchronization calibration;

a two-step random access MAC RAR format 4: the inactive UE ID is carried in the random access request, and the network side only confirms that the data in the random access request is received, and does not need the UE to be in a connected state;

a two-step random access MAC RAR format 5: C-RNTI of the UE in the connected state is carried in the random access request, and the network side needs the UE to perform uplink synchronization calibration;

a two-step random access MAC RAR format 6: C-RNTI of the UE in the connected state is carried in the random access request, and the network side does not need the UE to perform uplink synchronization calibration; and a two-step random access MAC RAR format 7: C-RNTI of the UE in the connected state is carried in the random access request, the network side confirms that the data content in the random access request is correctly received, and determines that the UE does not need subsequent uplink transmission, and the network side does not allocate an UL Grant.

In a third aspect, an embodiment of the present disclosure provides a user equipment (UE), which includes:

a sending module, configured to send a random access request, wherein information including a UE identifier is carried in the random access request; and a first processing module, configured to receive a random access response; wherein when UE identifier carried in the random access response is consistent with the UE identifier in the random access request, a contention resolution is completed; when the UE identifier carried in the random access response is inconsistent with the UE identifier in the random access request, the UE determines that the random access fails this time, and re-initiates a random access attempt; and when no UE identifier is carried in the random access response, the UE falls back to a random access process in which no UE identifier information is carried in the random access request;

wherein the random access response is adaptively generated by a network side in response to the random access request.

A random access that a UE identifier is carried in the random access request is called a two-step random access, and a random access that no UE identifier is carried in the random access request is called a four-step random access.

Optionally, the random access response is sent by using a medium access control protocol data unit (MAC PDU), the MAC PDU includes a MAC header and MAC RARs, the MAC header includes multiple MAC sub-headers, each MAC sub-header includes a random access preamble identifier (RAPID), which corresponds to a random access preamble in the random access request, each MAC sub-header corresponds to one MAC RAR, and a random access response MAC RAR carrying the UE identifier and a random access response MAC RAR carrying no UE identifier are multiplexed into one MAC PDU.

Optionally, for a four-step random access, a two-step random access and different random access scenarios for the two-step random access, MAC RARs with the same length are used, and the length of MAC RAR is fixed to be capable of including a maximum UE identifier length and a temporary cell radio network temporary identifier (Temporary C-RNTI), or to be capable of including a maximum UE identifier length, a Temporary C-RNTI and an uplink scheduling grant (UL Grant).

Optionally, the MAC RAR includes any one or more of the following:

T1: which indicates a MAC RAR of a four-step random access or a MAC RAR of a two-step random access is subsequent;

T2: which appears only in the MAC RAR of a two-step random access, and is used to indicate a long UE ID or a short UE ID;

Timing Advance Command: uplink timing advance;

UL Grant: resource allocation for subsequent uplink transmission;

Temporary C-RNTI: which is to be converted into a C-RNTI allocated for the UE after the contention resolution is completed;

Contention Resolution Identity: UE identifier information included in the random access request corresponding to two-step random access; and R: reserved bits.

Optionally, the MAC RAR includes all possible fields, each of which has a maximum value of possible lengths, and the length of each field is fixed; and if the field is not needed in the random access response, the field is actually reserved bits filled with a value specified in a protocol or a value determined by the network side.

Optionally, the sending module is further configured to send a preamble of the random access request, and not send information carrying the UE identifier; and the first processing module is further configured to receive the random access response, and determine a MAC sub-header corresponding to the sent preamble according to the RAPID field in the MAC sub-header; wherein the UE acquires a MAC RAR corresponding to the MAC sub-header, and wherein when the indication field in the MAC RAR is analyzed to determine that no UE identifier is carried in the MAC RAR, the UE reads subsequent fields in the MAC RAR, and performs related operations according to the indications of the fields to complete the subsequent random access process; and when the indication field in the MAC RAR is analyzed to determine that the UE identifier is carried in the MAC RAR, the UE determines that the random access fails, and subsequently re-initiates a new random access attempt.

Optionally, the sending module is further configured to send the random access request, which includes a preamble and information including the UE identifier;

the first processing module is further configured to receive the random access response, and determine a MAC sub-header corresponding to the sent preamble according to the RAPID field in the MAC sub-header; and acquire the MAC RAR corresponding to the MAC sub-header; wherein when the indication field T1 in the MAC RAR is analyzed to determine that no UE identifier is carried in the MAC RAR, the UE determines that only the preamble is received by the network side and no data part is correctly received, reads the subsequent fields in the MAC RAR, falls back to the four-step random access, analyzes each field in the MAC RAR according to the four-step random access process, and then completes the subsequent random access process according to the indications of the fields in the MAC RAR; or when the indication field T1 in the MAC RAR is analyzed to determine that the UE identifier is carried in the MAC RAR, and the indication field T2 is analyzed to determine that the UE identifier is a long UE ID, and when the UE sends a long UE ID, the UE determines whether the UE identifier in the MAC RAR is consistent with the long UE ID sent by the UE; when the UE identifier in the MAC RAR is consistent with the long UE ID sent by the UE, the UE determines that a contention resolution is completed, the UE receives a physical downlink control channel (PDCCH) scheduling command with the Temporary C-RNTI subsequently sent by the network side, and sends an uplink transmission in response to the scheduling command; and when the UE identifier in the MAC RAR is inconsistent with the long UE ID sent by the UE, the UE determines that the random access fails this time, and subsequently re-initiates a random access attempt; or when the indication field T1 in the MAC RAR is analyzed to determine that the UE identifier is carried in the MAC RAR, and the indication field T2 is analyzed to determine that the UE identifier is a long UE ID, and when the UE sends a short UE ID, the UE determines that the MAC RAR is not for the UE itself and the random access fails this time, and the UE subsequently re-initiates a random access attempt; or when the indication field T1 in the MAC RAR is analyzed to determine that the UE identifier is carried in the MAC RAR, and the indication field T2 is analyzed to determine that the UE identifier is a short UE ID, and when the UE sends a long UE ID, the UE determines that the MAC RAR is not for the UE itself and the random access fails this time, and the UE subsequently re-initiates a random access attempt; or when the indication field T1 in the MAC RAR is analyzed to determine that the UE identifier is carried in the MAC RAR, and the indication field T2 is analyzed to determine that the UE identifier is a short UE ID, and when the UE sends a short UE ID, the UE determines whether the UE identifier in the MAC RAR is consistent with the short UE ID sent by the UE; when the UE identifier in the MAC RAR is consistent with the short UE ID sent by the UE, the UE determines a contention resolution is completed, the UE analyzes an UL Grant in the MAC RAR, and sends a subsequent uplink transmission according to a resource indicated by the UL Grant in the MAC RAR; and when the UE identifier in the MAC RAR is inconsistent with the short UE ID sent by the UE, the UE determines that the random access fails this time, and subsequently re-initiates a random access attempt.

Optionally, the sending module is further configured to send the random access request, which includes a preamble and information including a UE ID; and the first processing module is further configured to receive the random access response, and determine a MAC sub-header corresponding to the sent preamble according to the RAPID field in the MAC sub-header; and acquire a MAC RAR corresponding to the MAC sub-header; wherein when the indication field T1 in the MAC RAR is analyzed to determine that no UE identifier is carried in the MAC RAR, the UE determines that only the preamble is received by the network side and no data part is correctly received, the UE only analyzes the Timing Advance Command, UL Grant, and Temporary C-RNTI fields in the MAC RAR, falls back to the four-step random access, then adjusts an uplink timing advance according to the indications of the fields in the MAC RAR, acquires Temporary C-RNTI, sends Msg3 according to the UL Grant and completes the subsequent random access process; or when the indication field T1 in the MAC RAR is analyzed to determine that the UE identifier is carried in the MAC RAR, and the indication field T2 is analyzed to determine that the UE identifier is a long UE ID, the UE analyzes all fields; when the UE sends a long UE ID, the UE determines whether the UE identifier in the MAC RAR is consistent with the long UE ID sent by the UE; when the UE identifier in the MAC RAR is consistent with the long UE ID sent by the UE, the UE determines that a contention resolution is completed, then the UE sends a subsequent uplink transmission according to a resource indicated by the UL Grant in the MAC RAR; and when the UE identifier in the MAC RAR is inconsistent with the long UE ID sent by the UE, the UE determines that the random access fails this time, and subsequently re-initiates a random access attempt; or when the indication field T1 in the MAC RAR is analyzed to determine that the UE identifier is carried in the MAC RAR, and the indication field T2 is analyzed to determine that the UE identifier is a long UE ID, the UE analyzes all fields; and when the UE sends a short UE ID, the UE determines that the MAC RAR is not for the UE itself and the random access fails this time, and the UE subsequently re-initiates a random access attempt; or when the indication field T1 in the MAC RAR is analyzed to determine that the UE identifier is carried in the MAC RAR, and the indication field T2 is analyzed to determine that the UE identifier is a short UE ID, the UE analyzes all fields; when the UE sends a long UE ID, the UE determines that the MAC RAR is not for the UE itself and the random access fails this time, and the UE subsequently re-initiates a random access attempt; or when the indication field T1 in the MAC RAR is analyzed to determine that the UE identifier is carried in the MAC RAR, and the indication field T2 is analyzed to determine that the UE identifier is a short UE ID, the UE analyzes all fields; when the UE sends a short UE ID, the UE determines whether the UE identifier in the MAC RAR is consistent with the short UE ID sent by the UE; when the UE identifier in the MAC RAR is consistent with the short UE ID sent by the UE, the UE determines that a contention resolution is completed, then the UE sends a subsequent uplink transmission according to a resource indicated by the UL Grant in the MAC RAR; and when the UE identifier in the MAC RAR is inconsistent with the short UE ID sent by the UE, the UE determines that the random access fails this time, and subsequently re-initiates a random access attempt.

Optionally, the MAC sub-header includes a preamble ID and a length indication field L, and wherein the length indication field L is used to indicate a length or a type of corresponding MAC RAR.

Optionally, the type of MAC RAR includes any one or more of the following:

a four-step random access MAC RAR format 1: applicable to a scenario where the UE initiates a four-step contention random access;

a four-step random access MAC RAR format 2: applicable to a scenario where the UE initiates a four-step non-contention random access;

a four-step random access MAC RAR format 3: applicable to a scenario where the UE initiates a four-step non-contention random access, and the network side determines that the UE only needs to perform synchronization and does not need to send uplink data;

a two-step random access MAC RAR format 1: a radio resource control (RRC) connection establishment or RRC connection reestablishment on a common control channel CCCH or an inactive UE identifier (UE ID) is carried in the random access request, the network side needs to allocate C-RNTI for the UE, and the network side needs the UE to perform uplink synchronization calibration;

a two-step random access MAC RAR format 2: the RRC connection establishment or the RRC connection reestablishment on the CCCH channel or the inactive UE ID is carried in the random access request, the network side needs to allocate C-RNTI for the UE, and the network side does not need the UE to perform the uplink synchronization calibration;

a two-step random access MAC RAR format 3: the RRC connection establishment or the RRC connection reestablishment on the CCCH channel or the inactive UE ID is carried in the random access request, the network side needs to allocate C-RNTI for the UE, and the network side does not need the UE to perform the uplink synchronization calibration;

a two-step random access MAC RAR format 4: the inactive UE ID is carried in the random access request, and the network side only confirms that the data in the random access request is received, and does not need the UE to be in a connected state;

a two-step random access MAC RAR format 5: C-RNTI of the UE in the connected state is carried in the random access request, and the network side needs the UE to perform uplink synchronization calibration;

a two-step random access MAC RAR format 6: C-RNTI of the UE in the connected state is carried in the random access request, and the network side does not need the UE to perform uplink synchronization calibration; and a two-step random access MAC RAR format 7: C-RNTI of the UE in the connected state is carried in the random access request, the network side confirms that the data content in the random access request is correctly received, and determines that the UE does not need subsequent uplink transmission, and the network side does not allocate an UL Grant.

Optionally, the sending module is further configured to send a preamble of the random access request, and not send information carrying a UE identifier; and the first processing module is further configured to receive the random access response, determine a MAC sub-header corresponding to the sent preamble according to the RAPID field in the MAC sub-header, and analyze an L field in the MAC sub-header to determine a length or a type of subsequent MAC RAR;

wherein when the L field indicates the type of the MAC RAR of the two-step random access, the UE determines that the random access response is not for the UE itself and the random access fails, and subsequently re-initiates a new random access attempt; and when the L field indicates the type of the MAC RAR of the four-step random access, the UE acquires the MAC RAR, and completes the required subsequent random access process according to the indications of the fields of the MAC RAR.

Optionally, the sending module is further configured to send the random access request, which includes a preamble and a UE identifier; and the first processing module is further configured to receive the random access response, determine a MAC sub-header corresponding to the sent preamble according to the RAPID field in the MAC sub-header, and analyze the L field in the MAC sub-header to determine a type of subsequent MAC RAR;

wherein when the MAC RAR type is a four-step random access RAR, the UE determines that the data part in the random access request is not correctly received by the network side, falls back to the four-step random access process, sends an Msg3 according to the MAC RAR indication, and receives a downlink transmission Msg4 to complete the contention resolution;

when the MAC RAR type is a two-step random access RAR, the following processing is performing according to different MAC RAR types indicated by the L field:

in a case that the format type is the two-step random access MAC RAR format 1, when a long UE ID is carried in the random access request, and the UE identifier in the MAC RAR is consistent with the long UE ID in the random access request, it is considered by the UE that the contention resolution is successful, and the UE performs uplink synchronization timing calibration, sends uplink data, and applies C-RNTI according to the indication in the MAC RAR; and when the UE sends a short UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 2, when a long UE ID is carried in the random access request, and the UE identifier in the MAC RAR is consistent with the long UE ID in the random access request, it is considered by the UE that the contention resolution is successful, and the UE sends uplink data and applies C-RNTI according to the indication in the MAC RAR; and when the UE sends a short UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 3, when a long UE ID is carried in the random access request, and the UE identifier in the MAC RAR is consistent with the long UE ID in the random access request, it is considered by the UE that the contention resolution is successful, and the UE applies C-RNTI according to the indication in the MAC RAR; and when the UE sends a short UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 4, when a long UE ID is carried in the random access request, and the UE identifier in the MAC RAR is consistent with the long UE ID in the random access request, it is considered by the UE that the contention resolution is successful, and the UE applies C-RNTI according to the indication in the MAC RAR, then receives a PDCCH scheduling command carrying the C-RNTI and sends uplink transmission in response to the scheduling command; and when the UE sends a short UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 5, when a short UE ID is carried in the random access request, and the UE identifier in the MAC RAR is consistent with the short UE ID in the random access request, it is considered by the UE that the contention resolution is successful, and the UE performs uplink synchronization timing calibration and sends uplink data according to the indication in the MAC RAR; and when the UE sends a long UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 6, when a short UE ID is carried in the random access request, and the UE identifier in the MAC RAR is consistent with the short UE ID in the random access request, it is considered by the UE that the contention resolution is successful, and the UE sends uplink data according to the indication in the MAC RAR; and when the UE sends a long UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 7, when a short UE ID is carried in the random access request, and the UE identifier in the MAC RAR is consistent with the short UE ID in the random access request, it is considered by the UE that the contention resolution is successful, then the UE monitors a PDCCH scheduling command carrying the C-RNTI, and once receiving a PDCCH scheduling command for scheduling uplink transmission, the UE sends uplink transmission in response to the scheduling command; and when the UE sends a long UE ID in the random access request or when the UE identifier in the MAC RAR is inconsistent with the UE identifier in the random access request, it is considered by the UE that the random access fails, and the UE subsequently re-initiates a random access attempt.

In a fourth aspect, an embodiment of the present disclosure provides a network side device, which includes:

a receiving module configured to receive a random access request sent by a user equipment (UE), wherein information including a UE identifier is carried in the random access request; and a second processing module configured to adaptively generate a random access response in response to the random access request, and send the random access response to the UE; wherein if the information including a UE identifier (ID) is carried in the random access request, the UE ID information is included in the random access response according to the two-step random access process; and if no information including a UE identifier is carried in the random access request, a random access response is generated according to the four-step random access.

Optionally, the random access response is sent by using a MAC PDU, the MAC PDU includes a MAC header and medium access control random access responses (MAC RARs), the MAC header includes multiple MAC sub-headers, each MAC sub-header includes a RAPID, which corresponds to a preamble in the random access request, each MAC sub-header corresponds to one MAC RAR, and a random access response MAC RAR carrying the UE identifier and a random access response MAC RAR carrying no UE identifier are multiplexed into one MAC PDU.

Optionally, for a four-step random access, a two-step random access and different random access scenarios for the two-step random access, MAC RARs with the same length are used, and the length of MAC RAR is fixed to be capable of including a maximum UE ID length and a Temporary C-RNTI, or to be capable of including a maximum UE ID length, a Temporary C-RNTI and an UL Grant.

Optionally, the MAC RAR includes any one or more of the following:

T1: which indicates a MAC RAR of a four-step random access or a MAC RAR of a two-step random access is subsequent;

T2: which appears only in the MAC RAR of a two-step random access, and is used to indicate a long UE ID or a short UE ID;

Timing Advance Command: uplink timing advance;

UL Grant: resource allocation for subsequent uplink transmission;

Temporary C-RNTI: which is to be converted into a C-RNTI allocated for the UE after the contention resolution is completed;

Contention Resolution Identity: UE identifier information included in the request corresponding to two-step random access; and R: reserved bits.

Optionally, the MAC RAR includes all possible fields, each of which has a maximum value of possible lengths, and the length of each field is fixed; and if the field is not needed in the random access response, the field is actually reserved bits filled with a value specified in a protocol or a value determined by the network side.

Optionally, the receiving module is further configured to receive a random access request, wherein the random access request includes a preamble and does not send information carrying the UE identifier, and the second processing module is further configured to send a random access response, wherein the random access response includes an uplink timing advance, an uplink transmission resource, and a Temporary C-RNTI configured for the UE according to the preamble.

Optionally, the receiving module is further configured to receive a random access request, wherein the random access request includes a preamble or includes a preamble and a data part; and the second processing module is further configured to generate and send a corresponding MAC RAR to the UE in response to the received random access request.

Optionally, when the indication field T1 in the generated MAC RAR determines that the UE identifier is carried in the MAC RAR, and the indication field T2 determines that the UE identifier is a long UE ID, the network side sends a PDCCH scheduling command that carries Temporary C-RNTI, and allocates subsequent uplink transmission resources to the UE.

Optionally, the MAC sub-header includes a preamble ID and a length indication field L, and wherein the length indication field L is used to indicate a length or a type of corresponding MAC RAR.

Optionally, the type of MAC RAR includes any one or more of the following:

a four-step random access MAC RAR format 1: applicable to a scenario where the UE initiates a four-step contention random access;

a four-step random access MAC RAR format 2: applicable to a scenario where the UE initiates a four-step non-contention random access;

a four-step random access MAC RAR format 3: applicable to a scenario where the UE initiates a four-step non-contention random access, and the network side determines that the UE only needs to perform synchronization and does not need to send uplink data;

a two-step random access MAC RAR format 1: a RRC connection establishment or RRC connection reestablishment on a CCCH or an inactive UE ID is carried in the random access request, the network side needs to allocate C-RNTI for the UE, and the network side needs the UE to perform uplink synchronization calibration;

a two-step random access MAC RAR format 2: the RRC connection establishment or the RRC connection reestablishment on the CCCH channel or the inactive UE ID is carried in the random access request, the network side needs to allocate C-RNTI for the UE, and the network side does not need the UE to perform the uplink synchronization calibration;

a two-step random access MAC RAR format 3: the RRC connection establishment or the RRC connection reestablishment on the CCCH channel or the inactive UE ID is carried in the random access request, the network side needs to allocate C-RNTI for the UE, and the network side does not need the UE to perform the uplink synchronization calibration;

a two-step random access MAC RAR format 4: the inactive UE ID is carried in the random access request, and the network side only confirms that the data in the random access request is received, and does not need the UE to be in a connected state;

a two-step random access MAC RAR format 5: C-RNTI of the UE in the connected state is carried in the random access request, and the network side needs the UE to perform uplink synchronization calibration;

a two-step random access MAC RAR format 6: C-RNTI of the UE in the connected state is carried in the random access request, and the network side does not need the UE to perform uplink synchronization calibration; and a two-step random access MAC RAR format 7: C-RNTI of the UE in the connected state is carried in the random access request, the network side confirms that the data content in the random access request is correctly received, and determines that the UE does not need subsequent uplink transmission, and the network side does not allocate an UL Grant.

In a fifth aspect, an embodiment of the present disclosure provides a user equipment (UE), which includes a processor, a transceiver and a memory, wherein the processor is configured to read programs in the memory to perform the following process:

sending a random access request, wherein information including a UE identifier is carried in the random access request; and receiving a random access response, wherein when UE identifier carried in the random access response is consistent with the UE identifier in the random access request, a contention resolution is completed; when the UE identifier carried in the random access response is inconsistent with the UE identifier in the random access request, the UE determines that the random access fails this time, and re-initiates a random access attempt; and when no UE identifier is carried in the random access response, the UE falls back to a random access process in which no UE identifier information is carried in the random access request;

wherein the random access response is generated by a network side in response to the random access request;

the transceiver is configured to receive and transmit data; and the memory is configured to store data used by the processor in performing operations.

In a sixth aspect, an embodiment of the present disclosure provides a network side device, which includes a processor, a transceiver and a memory, wherein the processor is configured to read programs in the memory to perform the following process:

receiving a random access request sent by a user equipment (UE), wherein information including a UE identifier is carried in the random access request; and generating a random access response in response to the random access request, and sending the random access response to the UE, the transceiver is configured to receive and transmit data, and the memory is configured to store data used by the processor in performing operations.

One of the foregoing technical solutions has the following advantages or advantageous effects. If the UE identifier carried in the random access response is consistent with the UE identifier in the random access request, the UE completes the contention resolution; if the UE identifier carried in the random access response is inconsistent with the UE identifier in the random access request, the UE determines that the random access fails this time, and re-initiates a random access attempt; and if no UE identifier is carried in the random access response, the UE falls back to a random access process (four-step random access, also called 4-step RA) in which no UE identifier information is carried in the random access request. Therefore, not only a unified process is ensured, but also the UE is capable of obtaining a correct feedback in cases of different random access purposes and types. Meanwhile, due to the use of the unified process and the adaptive MAC RAR, when the UE initiates a two-step random access, if an expected feedback is not received in the random access response, the UE may fall back to the four-step random access.

BRIEF DESCRIPTION OF THE DRAWINGS

FIG. 11b is a schematic diagram of a 2-step MAC RAR for a long UE ID according to at least one embodiment of the present disclosure;

FIG. 11c is a schematic diagram of a 2-step MAC RAR for a short UE ID according to at least one embodiment of the present disclosure;

FIG. 12 is a schematic diagram of a MAC RAR with a fixed length according to at least one embodiment of the present disclosure;

FIG. 13d-13j are schematic diagrams of 2-step RA MAC RAR formats according to at least one embodiment of the present disclosure;

FIGS. 14b to 14d are schematic diagrams of MAC RAR according to at least one embodiment of the present disclosure;

FIG. 15a is a schematic diagram of a MAC sub-header according to at least one embodiment of the present disclosure;

DETAILED DESCRIPTION

Various exemplary embodiments of the present disclosure are described more fully hereinafter with reference to the accompanying drawings. Although the exemplary embodiments of the present disclosure are shown, it should be understood that the present disclosure may be embodied in various forms and should not be construed as being limited to the embodiments set forth herein. Rather, these embodiments are provided so that the present disclosure is thoroughly understood, and the scope of the present disclosure is fully conveyed to those skilled in the art.

Figure 1:
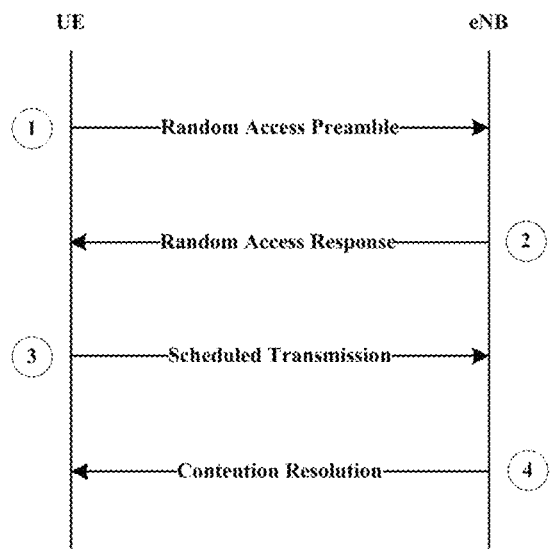
FIG. 1 is a schematic diagram of a MAC sub-header including a random access code number.
Figure 2:
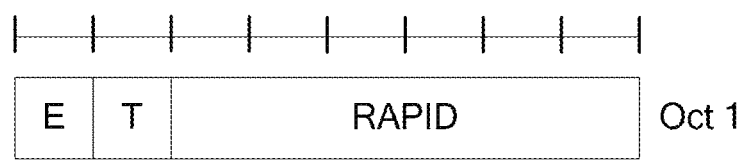
FIG. 2 is a schematic diagram of a MAC RAR.
Figure 3:
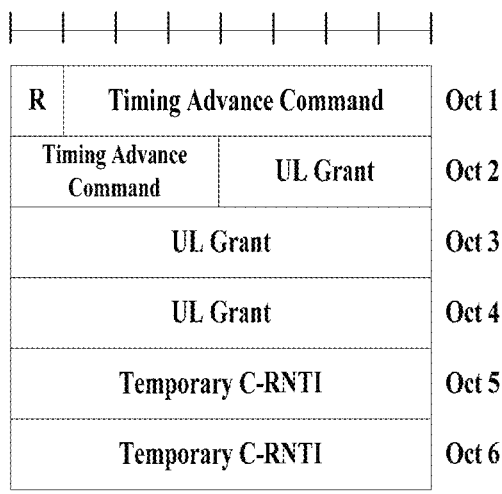
FIG. 3 is a schematic diagram of a contention random access process.
Figure 4:
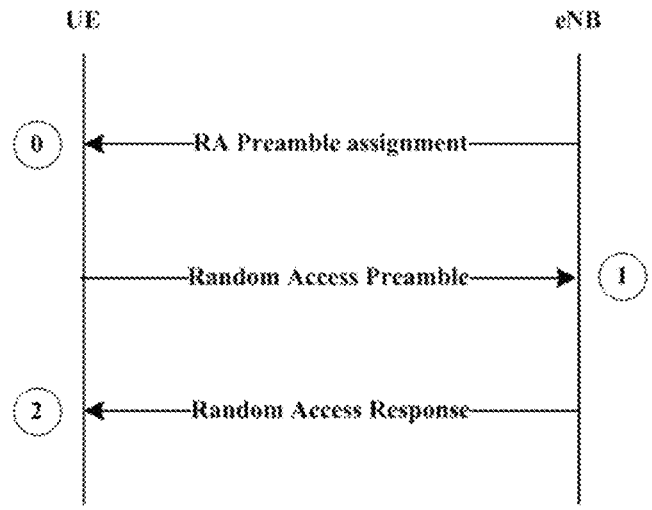
FIG. 4 is a schematic diagram of a non-contention random access process.
Figure 5:
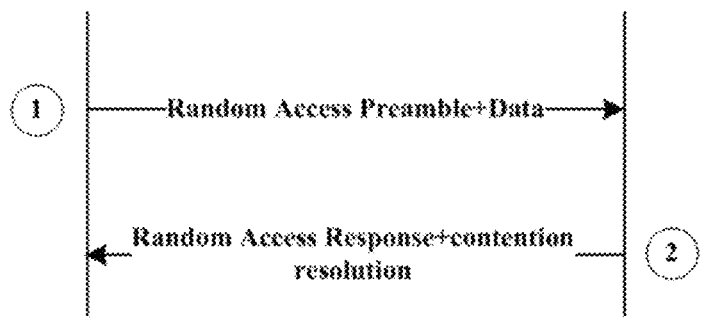
FIG. 5 is a schematic diagram of a 2-step RA.
Figure 6:
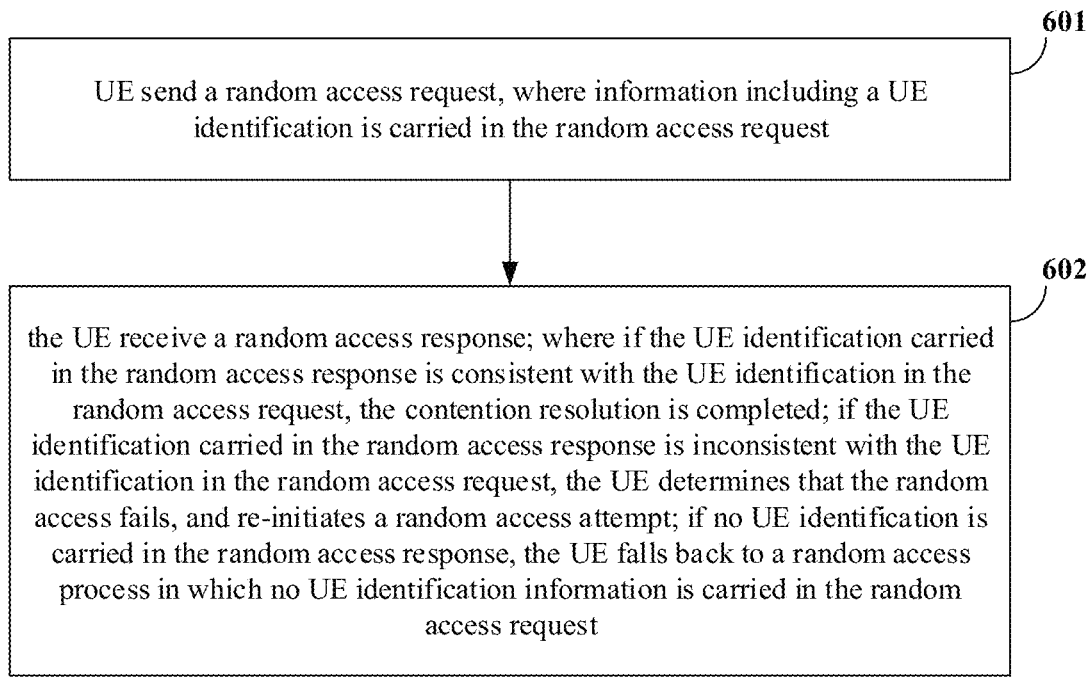
FIG. 6 is a schematic flowchart of a method for responding to a random access on a user equipment (UE) side according to at least one embodiment of the present disclosure.

Referring to FIG. 6, a schematic flowchart of a method for responding to a random access on a user equipment (UE) side is shown, which specifically includes the following steps:

step 601, a user equipment (UE) sending a random access request, wherein information including a UE identifier is carried in the random access request; and step 602, the UE receiving a random access response, wherein when UE identifier carried in the random access response is consistent with the UE identifier in the random access request, a contention resolution is completed; when the UE identifier carried in the random access response is inconsistent with the UE identifier in the random access request, the UE determines that the random access fails this time, and re-initiates a random access attempt; and when no UE identifier is carried in the random access response, the UE falls back to a random access process in which no UE identifier information is carried in the random access request; and wherein the random access response is adaptively generated by a network side in response to the random access request.

In at least one embodiment of the present disclosure, a random access in which the UE identifier is carried in the random access request is also called a two-step random access (2-step RA), while a random access in which no UE identifier is carried in the random access request is called a four-step random access (4-step RA).

Figure 7:
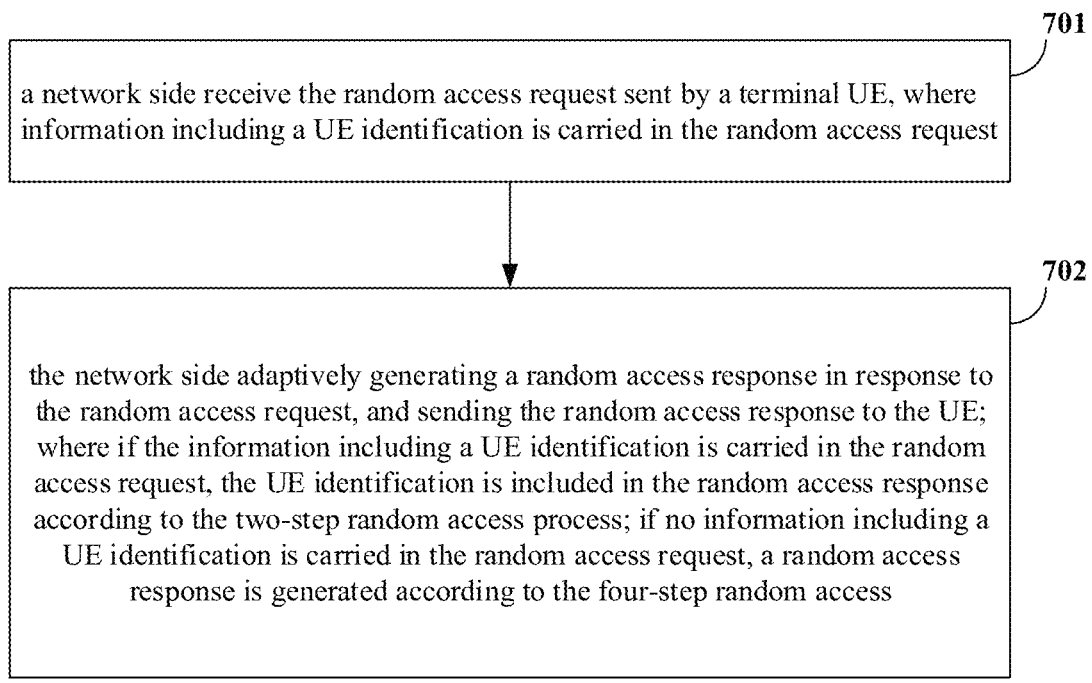
FIG. 7 is a schematic flowchart of a method for responding to a random access on a network side according to at least one embodiment of the present disclosure.

Referring to FIG. 7, a schematic flowchart of a method for responding to a random access on a network side is shown, which specifically includes the following steps:

step 701, a network side receiving a random access request sent by a user equipment (UE), wherein information including a UE identifier is carried in the random access request; and step 702, the network side generating a random access response in response to the random access request, and sending the random access response to the UE. If information including a UE identifier is carried in the random access request, the UE identifier is included in the random access response according to the two-step random access process; and if no information including a UE identifier is carried in the random access request, a random access response is generated according to the four-step random access.

In at least one embodiment of the present disclosure, a unified process is applied for different random access purposes and random access types (the four-step random access and the two-step random access). That is, the UE sends a random access request (step 1) and receives a random access response (step 2) by a unified rule.

Figure 8:
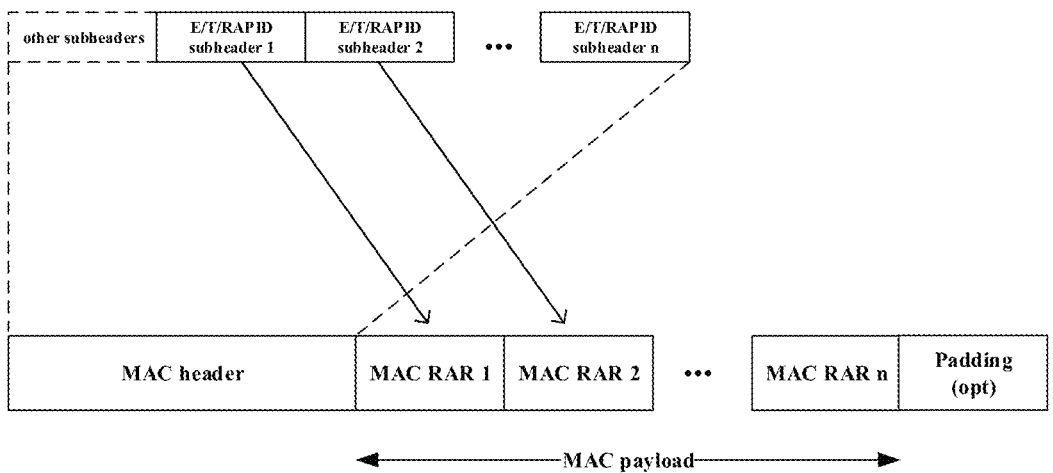
FIG. 8 is a schematic diagram of a MAC PDU format of a random access response according to at least one embodiment of the present disclosure.

A unified MAC PDU is used for the random access response. Referring to FIG. 8, the MAC PDU includes a MAC header and MAC RARs, the MAC header may include multiple MAC sub-headers, each MAC sub-header includes a random access preamble identifier (RAPID), which corresponds to a preamble in the random access request (step1). Each MAC sub-header corresponds to one MAC RAR, and a random access response MAC RAR carrying the UE identifier and a random access response MAC RAR carrying no UE identifier may be multiplexed into one MAC PDU. As such, a random access response of UE may be completed.

In at least one embodiment of the present disclosure, with the adaptive MAC RAR design, not only a unified process is ensured, but also the UE is capable of obtaining a correct feedback in cases of different random access purposes and types. Meanwhile, due to the use of the unified process and the adaptive MAC RAR, when the UE initiates a two-step random access, if an expected feedback is not received in the random access response, the UE may fall back to the four-step random access. There are two design methods for MAC RAR, i.e., a variable length and a fixed length, which correspond to different designs of the MAC sub-header. The details are described as follows.

The design of the MAC sub-header: the MAC sub-header corresponds to the MAC RAR in a one-on-one correspondence, and there are two different design methods for the MAC sub-header according to whether the MAC RAR has a fixed length or a variable length.

a) Method 1: MAC Sub-Header for the MAC RAR with a Fixed Length

Figure 9:
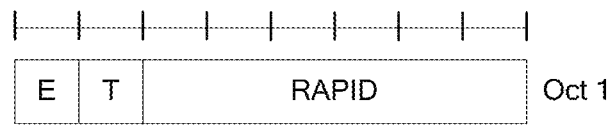
FIG. 9 is a schematic diagram of a MAC sub-header corresponding to a MAC RAR with a fixed length according to at least one embodiment of the present disclosure.

As shown in FIG. 9, the format is consistent with the MAC sub-header in the LTE random access response MAC PDU, mainly includes a preamble ID (namely RAPID) field, and other bits are necessary indication fields that cooperate with other parts of the MAC PDU. It should be noted that FIG. 9 is just a schematic diagram. If the length of the preamble changes in the 5G system, the bits occupied by the RAPID field may be increased, that is, the MAC sub-header in FIG. 9 may occupy 2 bytes, and the same applies to the RAPID field in the following method 2 for the design of the MAC sub-header.

b) Method 2: MAC Sub-Header for the MAC RAR with a Variable Length

Figure 10:
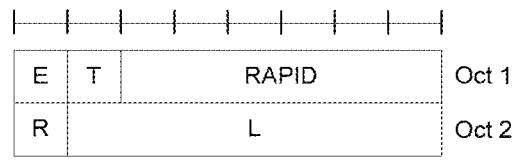
FIG. 10 is a schematic diagram of a MAC sub-header corresponding to a MAC RAR with a variable length according to at least one embodiment of the present disclosure.

As shown in FIG. 10, the MAC sub-header mainly contains two parts: a preamble ID (RAPID) and a length indication field L. The length of the length indication field L is limited to be within 8 bits (namely 1 byte). If the L length is less than 8 bits, other indication bits in 1 byte may be set as reserved bits R, and FIG. 10 shows an example in which the L length is 7 bits. There are two expressions for the L field. One is to directly indicate the length of corresponding RAR, for example, if the RAR length is 6 bytes, the L field is expressed as 0000110. The other expression is to indicate the RAR type. If there are N types of the RAR, L only needs to indicate which of the N types the RAR is. For the design of the MAC RAR with the variable length, FIG. 13*a* to FIG. 13*j* show 10 kinds of MAC RAR lengths, and the L field may correspondingly indicate the formats shown in FIG. 13*a* to FIG. 13*j*. The MAC RAR formats shown in FIG. 13*a* to FIG. 13*j* may not always exist at the same time, and the MAC RAR types that the L field need to indicate may be less.

The Design of MAC RAR a) Method 1: RAR with a Fixed Length

Figure 11A:
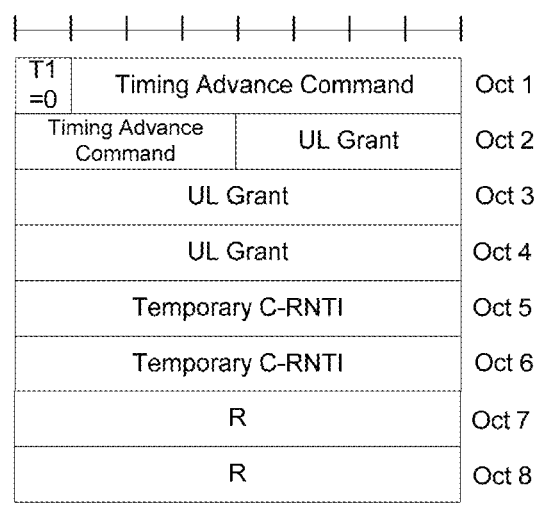
FIG. 11a is a schematic diagram of a 4-step MAC RAR according to at least one embodiment of the present disclosure.
Figure 13A:
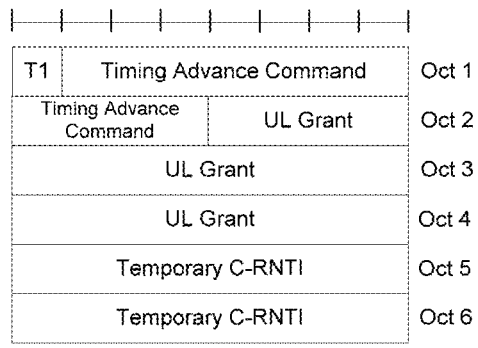
FIG. 13a-13c are schematic diagrams of 4-step RA MAC RAR formats according to at least one embodiment of the present disclosure.
Figure 13B:
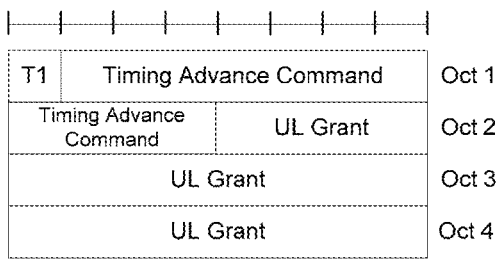
Figure 13C:
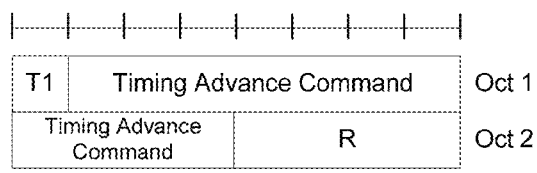
Figure 13D:
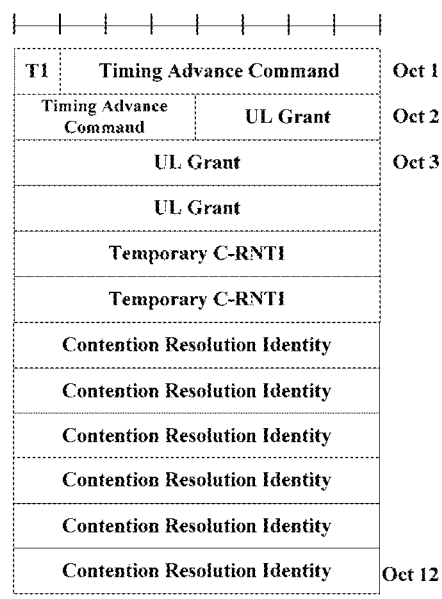
Figure 13H:
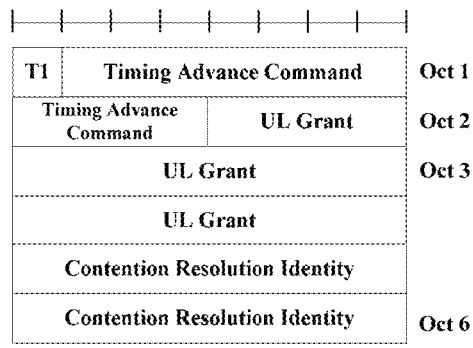
Figure 13I:
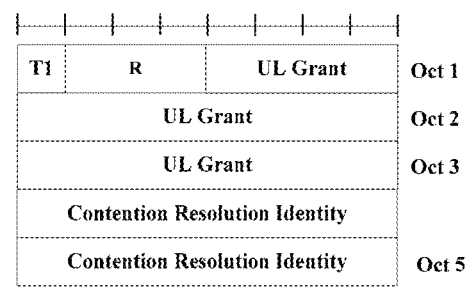
Figure 13J:
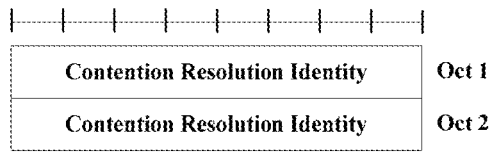

The design of RAR with the same length is used for the RAR with the fixed length for 4-step RA, 2-step RA, and different random access scenarios of 2-step RA. See FIGS. 11*a*, 11*b* and 11*c*.

Method 1-1: The length of RAR is fixed to be capable of including the maximum UE ID length and Temporary C-RNTI. The specific field content may be different for different random access response scenarios, but the bits indicate different specific formats of RAR.

There are specifically the following formats: MAC RAR is fixed to be 8 bytes, the maximum UE ID length is 46 bits, the Temporary C-RNTI length is 16 bits, and the UL Grant length is 20 bits. In actual applications, the length of each field may change. For example, if the UL Grant length is 12 bits, the total length of the MAC RAR is 7 bytes. The description of each field is as follows.

T1: which indicates whether the 4-step RA MAC RAR or the 2-step RA MAC RAR is subsequent. For example, T=0 indicates that the MAC RAR does not carry the UE identifier, and T=1 indicates that the MAC RAR carries the UE identifier. Of course, it is to be understood that the specific value of T1 is not limited in at least one embodiment of the present disclosure.

T2: which appears only in the 2-step RA MAC RAR to indicate whether a long UE ID or a short UE ID is subsequent. For example, T2=0 indicates that the UE identifier carried by the MAC RAR is a long UE ID, and T2=1 indicates that the UE identifier carried by the MAC RAR is a short UE ID. Of course, it is to be understood that the specific value of T2 is not limited in at least one embodiment of the present disclosure.

Timing Advance Command (timing advance command): uplink timing advance.

UL Grant (uplink scheduling grant): the resource allocation of the subsequent uplink transmission. If there is no such field, the uplink transmission is scheduled by the PDCCH with Temporary C-RNTI (the Temporary C-RNTI has been converted into C-RNTI) subsequently. The length is 20 bits or 12 bits. The figures show 20 bits as an example.

Temporary C-RNTI (temporary cell radio network temporary identifier): after the contention resolution is completed, the Temporary C-RNTI is converted into C-RNTI allocated for the UE, and the length is 16 bits.

Contention Resolution Identity (contention resolution identity): which corresponds to information including the UE identifier carried in the random access request for the two-step random access. The long UE ID corresponds to the initial access, the connection reestablishment, and a scenario where the inactive UE initiates a random access. In this case, the UE ID includes a RRC connection establishment request message, a RRC connection reestablishment request message, and an inactive UE ID. The short UE ID corresponds to a random access initiated by the UE in the connected state, which is C-RNTI.

R: reserved bits, which may be set to be a value specified in the protocol, or may be determined and filled by the network side itself.

Method 1-2: the RAR contains all possible fields, each of which has the maximum value of the possible lengths.

Possible fields include: TAC (Tracking Area Code), UL grant, Temporary C-RNTI, and UE ID. Contention Resolution Identity is unique for 2-step RA, and is a redundant field for 4-step RA. Other fields, such as TAC, may be redundant fields for 2-step RA. The schematic diagram of RAR is shown in FIG. 12. The Contention Resolution Identity has a maximum value of 6 bytes. The length of each field is fixed. If the field is originally not needed in the random access response, the field is actually reserved bits, which is filled with a value specified in the protocol or a value determined by the network side. The first bit T1 of the MAC RAR is an indication bit, which is used to indicate whether the MAC RAR includes the Contention Resolution Identity or not. For example, T1=0 indicates that the subsequent is a response to a four-step random access, and the value of the Contention Resolution Identity is negligible; and T1=1 indicates that the subsequent is a response to a two-step random access, and the Contention Resolution Identity is the same as the UE ID carried in the data field of the random access request (step 1). The indication bit T2 further indicates whether the subsequent UE ID is a short UE ID or a long UE ID, for example, T2=0 indicates a long UE ID, and T2=1 indicates a short UE ID.

b) Method 2: RAR with a Variable Length

The RAR with a variable length indicates that the network side may adaptively generate a MAC RAR with the most suitable length in response to a random access request, and the MAC RAR only needs to include the necessary field. There are the following types of the RAR with a variable length. It should be noted that these MAC RAR types do not necessarily exist in the protocol. In the figures, the T1 field may be used to distinguish formats of MAC RAR with the same length, if L field in the MAC sub-header indicates the MAC RAR length, for example, distinguish formats shown in FIG. 13*a* and FIG. 13*g* and distinguish formats shown in FIG. 13*g* and FIG. 13*h*. However, the MAC RARs of FIG. 13*c* and FIG. 13*i* have the same length. Since the MAC RAR of FIG. 13*c* has no remaining bit for distinguishing indications, if the formats of FIG. 13*c* and FIG. 13*i* coexist, the L field in the MAC sub-header may only be used to indicate the format type of the MAC RAR, but cannot be used to indicate the MAC RAR length. Applicable scenarios for each format are described as follows.

a 4-step RA (four-step random access) MAC RAR format 1: applicable to a scenario where the UE initiates a 4-step (four-step) contention random access;

a 4-step RA MAC RAR format 2: applicable to a scenario where the UE initiates a 4-step non-contention random access;

a 4-step RA MAC RAR format 3: applicable to a scenario where the UE initiates a 4-step non-contention random access, and the network side determines that the UE only needs to perform synchronization and does not need to send uplink data;

a 2-step RA (two-step random access) MAC RAR format 1: the RRC connection establishment or the RRC connection reestablishment on the CCCH channel or the inactive UE ID (or called resume ID) is carried in the random access request (step 1), the network side needs to allocate C-RNTI for the UE, and the network side needs the UE to perform the uplink synchronization calibration (although the UE was already in the uplink synchronization state);

a 2-step RA MAC RAR format 2: the RRC connection establishment or the RRC connection reestablishment on the CCCH channel or the inactive UE ID (or called resume ID) is carried in the random access request (step 1), the network side needs to allocate C-RNTI for the UE, and the network side does not need the UE to perform the uplink synchronization calibration;

a 2-step RA MAC RAR format 3: the RRC connection establishment or the RRC connection reestablishment on the CCCH channel or the inactive UE ID (or called resume ID) is carried in the random access request (step 1), the network side needs to allocate C-RNTI for the UE, and the network side does not need the UE to perform the uplink synchronization calibration;

a 2-step RA MAC RAR format 4: the inactive UE ID (or called resume ID) is carried in the random access request (step 1), and the network side only confirms that the data in the random access request is received, and does not need the UE to be in the connected state;

a 2-step RA MAC RAR format 5: C-RNTI of the UE in the connected state is carried in the random access request (step 1), and the network side needs the UE to perform uplink synchronization calibration;

a 2-step RA MAC RAR format 6: C-RNTI of the UE in the connected state is carried in the random access request (step 1), and the network side does not need the UE to perform uplink synchronization calibration; and a 2-step RA MAC RAR format 7: C-RNTI of the UE in the connected state is carried in the random access request (step 1), the network side confirms that the data content in the random access request is correctly received, and determines that the UE does not need subsequent uplink transmission, and therefore the network side does not allocate an UL Grant.

It should be noted that the locations of different fields in the foregoing MAC PDU format may not be limited to those shown in the figures, and different field locations may be exchanged. For example, in the MAC RAR format including a UE ID, the UE ID may be placed in front of or behind other fields. For the indication bits T1, T2, the opposite value indications may be used as long as the indications can be clearly distinguished.

In at least one embodiment of the present disclosure, a method 1-1 for the MAC RAR with the fixed length is provided, where the UE only sends a preamble (four-step random access).

In the method 1-1 for the MAC RAR with the fixed length, the MAC PDU format includes a MAC sub-header (FIG. 14a) and MAC RARs (FIG. 14b to FIG. 14d) as follows.

Figure 14A:
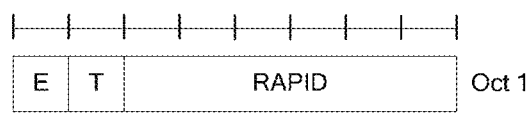
FIG. 14a is a schematic diagram of a MAC sub-header according to at least one embodiment of the present disclosure.
Figure 14B:
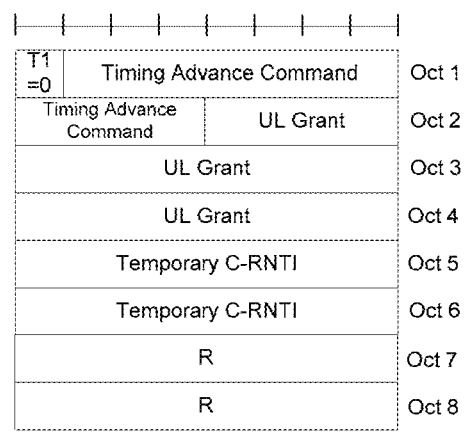

UE Side:

Step 1: sending a random access request preamble;

Step 2: receiving a random access response, determining that the preamble number is the same as that sent by the UE itself according to the RAPID field in the MAC sub-header, and analyzing the corresponding MAC RAR; and Step 3: acquiring MAC RAR (1) in the format shown in FIG. 14b. If T1=0, the UE reads the subsequent fields, performs the related operations according to the indications of the fields, which include uplink timing adjustment, sending uplink data transmission according to UL Grant, and acquiring the allocated Temporary C-RNTI to complete the subsequent random access process; if T1=1, it is determined by the UE that the random access response is not for the UE itself, the random access fails, and the UE may initiate a new random access attempt subsequently.

Network Side:

Step 1: receiving a random access request preamble;

Step 2: sending a random access response, and configuring an uplink timing advance, an uplink transmission resource, and Temporary C-RNTI for the UE; and Step 3: analyzing the subsequent uplink transmission of the UE to complete the random access process.

In at least one embodiment of the present disclosure, a method 1-1 for the MAC RAR with a fixed length is provided, where the UE sends a preamble and a UE ID (two-step random access).

The MAC PDU formats are the same as those of the above embodiment, which are shown still in FIG. 14a to FIG. 14b.

UE Side:

Step 1: sending a random access request, which includes a preamble, a UE ID, and other uplink transmissions (such as BSR, PHR, and uplink data). The random access request needs to distinguish whether the UE sends a long UE ID or a short UE ID. A long UE ID and a short UE ID may be differentiated by using different LCID fields in the MAC sub-header.

Step 2: receiving a random access response, determining that the preamble number is the same as that sent by the UE itself according to the RAPID field in the MAC sub-header, and analyzing the corresponding MAC RAR.

Step 3: analyzing T1 with the following branches.

3-1: If T1=0, MAC RAR (1) is acquired, with the format shown in FIG. 14b, wherein the UE determines that the network side only receives the preamble and does not correctly receive the data part, and the operation proceeds to step 4-1.

3-2: If T1=1 and T2=0, MAC RAR (2) is acquired, with the format shown in FIG. 14c. If the UE sends a long UE ID in step 1, the operation proceeds to step 4-2; and if the UE sends a short UE ID in step 1, it is determined by the UE that the MAC RAR is not for the UE itself, the current random access fails, and the UE may re-initiate a random access attempt subsequently.

3-3, If T1=1 and T2=1, MAC RAR (3) is acquired, with the format shown in FIG. 14d. If the UE sends a long UE ID in step 1, it is determined by the UE that the MAC RAR is not for the UE itself, the current random access fails, and the UE may re-initiate a random access attempt subsequently; and if the UE sends a short UE ID in step 1, the operation proceeds to step 4-3.

Step 4: There are the following branches according to the results of step 3.

4-1: The UE receives the subsequent fields in the MAC RAR (1) and falls back to the four-step random access, that is, the UE analyzes the fields in the MAC RAR (1) and proceeds to step 5-1, according to the four-step random access process.

4-2: The UE receives the MAC RAR (2), determines whether the value in the Contention Resolution Identity is consistent with the UE ID sent in step 1. If the value in the Contention Resolution Identity is consistent with the UE ID sent in step 1, the UE determines that the contention resolution is completed, and proceeds to step 5-2; and if the value in the Contention Resolution Identity is inconsistent with the UE ID sent in step 1, the UE determines that the current random access fails, and may subsequently re-initiate a random access attempt.

4-3: The UE receives the MAC RAR (3), determines whether the value in the Contention Resolution Identity is consistent with the UE ID sent in step 1. If the value in the Contention Resolution Identity is consistent with the UE ID sent in step 1, the UE determines that the contention resolution is completed, analyzes the UL Grant in the MAC RAR, and proceeds to step 5-3; and if the value in the Contention Resolution Identity is inconsistent with the UE ID sent in step 1, the UE determines that the current random access fails, and may subsequently re-initiate a random access attempt.

Step 5: There are the following branches according to the results of step 4.

5-1: The UE adjusts the uplink timing advance, acquires Temporary C-RNTI, sends a Msg3 according to the UL Grant, and completes the subsequent random access process, according to the indications of the fields in the MAC RAR.

5-2: The UE receives a PDCCH scheduling command with Temporary C-RNTI sent by the network side, and sends the uplink transmission in response to the scheduling command.

5-3: The UE sends the subsequent uplink transmission according to the resource indicated by the UL Grant in the MAC RAR.

Network Side:

Step 1: receiving a random access request, which may include a preamble, or a preamble and a data part;

Step 2: generating and sending a corresponding MAC RAR to the UE in response to the received random access request; if the MAC RAR (2) is generated, sending a PDCCH scheduling command with Temporary C-RNTI to allocate the subsequent uplink transmission resources for the UE; and Step 3: receiving the uplink transmission on the scheduled resource; if it is a four-step random access, completing the subsequent Msg3 and Msg4.

In at least one embodiment of the present disclosure, a method 1-2 for the MAC RAR with a fixed length is provided, where the UE only sends a preamble (four-step random access).

Figure 15B:
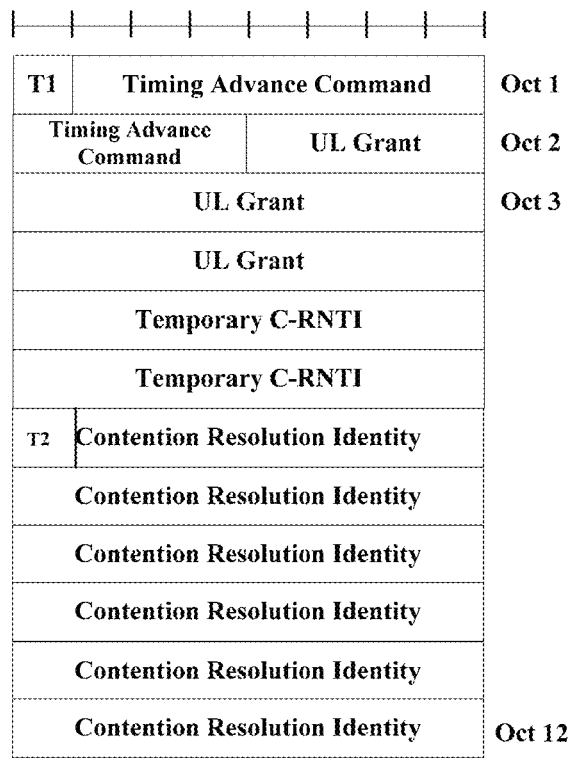
FIG. 15b is a schematic diagram of a MAC RAR according to at least one embodiment of the present disclosure.

In the method 1-2 for the MAC RAR with a fixed length, the MAC PDU format includes the following MAC sub-header (FIG. 15a) and MAC RAR (FIG. 15b).

UE Side:

Step 1: sending a random access request preamble;

Step 2: receiving a random access response, determining that the preamble number is the same as that sent by the UE itself according to the RAPID field in the MAC sub-header, and analyzing the corresponding MAC RAR; and Step 3: acquiring the MAC RAR with the format shown in FIG. 15b, analyzing T1=0, reading the subsequent fields, and performing the related operations according to the indications of the fields, which includes uplink timing adjustment, sending uplink data transmission according to UL Grant, and acquiring the allocated Temporary C-RNTI to complete the subsequent random access process; if T1=1, it is determined by the UE that the random access response is not for the UE itself, the random access fails, and the UE may re-initiate a random access attempt subsequently.

Network Side:

Step 1: receiving a random access request preamble;

Step 2: sending a random access response, and allocating an uplink timing advance, an uplink transmission resource, and Temporary C-RNTI for the UE; and Step 3: analyzing the subsequent uplink transmission of the UE to complete the random access process.

In at least one embodiment of the present disclosure, a method 1-2 for the MAC RAR with a fixed length is provided, where the UE sends a preamble and a UE ID (two-step random access).

The MAC PDU formats are the same as those of the above embodiment, which are shown still in FIGS. 15a and 15b.

UE Side:

Step 1: sending a random access request, which includes a preamble, a UE ID, and other uplink transmissions (such as BSR, PHR, and uplink data). The random access request needs to distinguish whether the UE sends a long UE ID or a short UE ID. A long UE ID and a short UE ID may be distinguished by using different LCID fields in the MAC sub-header.

Step 2: receiving a random access response, determining that the preamble number is the same as that sent by the UE itself according to the RAPID field in the MAC sub-header, and analyzing the corresponding MAC RAR.

Step 3: analyzing T1 with the following branches.

3-1: If T1=0, the UE determines that the network side only receives the preamble and does not correctly receive the data part, and the operation proceeds to step 4-1.

3-2: If T1=1 and T2=0, all fields are analyzed. If the UE sends a long UE ID in step 1, the operation proceeds to step 4-2; and if the UE sends a short UE ID in step 1, it is determined by the UE that the MAC RAR is not for the UE itself, the current random access fails, and the UE may re-initiate a random access attempt subsequently.

3-3, If T1=1 and T2=1, all fields are analyzed. If the UE sends a long UE ID in step 1, it is determined by the UE that the MAC RAR is not for the UE itself, the current random access fails, the UE may re-initiate a random access attempt subsequently; and if the UE sends a short UE ID in step 1, the operation proceeds to step 4-2.

Step 4: There are the following branches according to the results of step 3.

4-1: The UE only analyzes the Timing Advance Command, UL Grant, and Temporary C-RNTI field in the MAC RAR, and falls back to the four-step random access, that is, the operation proceeds to step 5-1, according to the four-step random access process.

4-2: the UE determines whether the value in the Contention Resolution Identity is consistent with the UE ID sent in step 1; if the value in the Contention Resolution Identity is consistent with the UE ID sent in step 1, the UE determines that the contention resolution is completed, and proceeds to step 5-2; and if the value in the Contention Resolution Identity is inconsistent with the UE ID sent in step 1, the UE determines that the current random access fails, and may subsequently re-initiate a random access attempt.

Step 5: There are the following branches according to the results of step 4.

5-1: The UE adjusts the uplink timing advance, acquires Temporary C-RNTI, sends an Msg3 according to the UL Grant, and completes the subsequent random access process (Msg3, Msg4), according to the indications of the fields in the MAC RAR.

5-3: The UE sends the subsequent uplink transmission according to the resource indicated by the UL Grant in the MAC RAR.

Network Side:

Step 1: receiving a random access request, which include a preamble, or a preamble and a data part;

Step 2: generating and sending a corresponding MAC RAR to the UE in response to the received random access request; and Step 3: receiving the uplink transmission on the scheduled resource; and if it is determined by the network side that the random access is a four-step random access, completing the subsequent Msg3 and Msg4.

In at least one embodiment of the present disclosure, for the MAC RAR with a variable length, the UE only sends a preamble (four-step random access).

Figure 16:
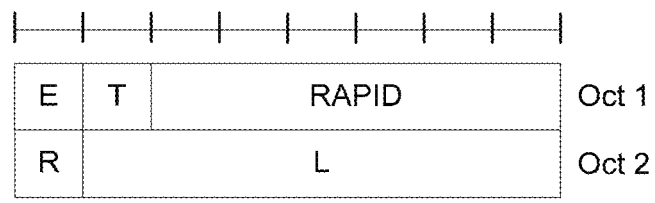
FIG. 16 is a schematic diagram of a MAC sub-header corresponding to a MAC RAR with a variable length according to at least one embodiment of the present disclosure.

The format of the MAC sub-header in the random access response MAC PDU is shown in FIG. 16, and the possible formats of MAC RAR are shown in FIGS. 13*a*-13*j*. In at least one embodiment of the present disclosure, L is used to indicate which MAC RAR format is used, for example, L=1 indicates a format 1, and L=10 indicates a format 10. In practical applications, 10 kinds of the MAC RAR format may not all coexist.

UE Side:

Step 1: sending a random access request preamble;

Step 2: receiving a random access response, determining whether the preamble number is the same as that sent by the UE itself according to the RAPID field in the MAC sub-header; if the preamble number is the same as that sent by the UE itself, analyzing the L-field to determine the subsequent MAC RAR type. If the L-field indicates the MAC RAR type of the two-step random access, it is determined by the UE that the random access response is not for the UE itself, the random access fails, and the UE may subsequently initiate a new random access attempt; and if the MAC RAR type is a four-step random access RAR, the operation proceeds to step 3.

Step 3: acquiring the MAC RAR. Three kinds of MAC RARs shown in FIG. 13*a* to FIG. 13*c* may not all coexist, and it is highly possible that there is only one MAC RAR shown in FIG. 13*a*. The UE completes the required subsequent random access process (Msg3, Msg4) according to the indications of the fields in the MAC RAR.

Network Side:

Step 1: receiving a random access request preamble;

Step 2: generating a random access response in response to the random access response, the random access response including the correct MAC sub-header and MAC RAR; and Step 3: analyzing the subsequent uplink transmission of the UE to complete the random access process.

In at least one embodiment of the present disclosure, for the MAC RAR with a variable length, the UE sends a preamble and a UE ID (two-step random access)

The format of the MAC sub-header is shown in FIG. 15, and the formats of the MAC PDU are shown in FIGS. 13*a*-13*j*.

UE Side:

Step 1: sending a random access request, which includes a preamble, a UE ID, and other uplink transmission (such as BSR, PHR, and uplink data). The random access request needs to distinguish whether the UE sends a long UE ID or a short UE ID. A long UE ID and a short UE ID may be distinguished by using different LCID fields in the MAC sub-header.

Step 2: receiving a random access response, determining whether the preamble number is the same as that sent by the UE itself according to the RAPID field in the MAC sub-header; and if the preamble number is the same as that sent by the UE itself, analyzing the L-field to determine the subsequent MAC RAR type.

Step 3: There are the following branches according to different MAC RAR types indicated by the L field.

If the L field indicates the MAC RAR type of the four-step random access (FIG. 13*a*), the UE determines that the network side does not correctly receive the data part of the random access request, and falls back to the four-step random access process, that is, according to the indication of the MAC RAR, the UE sends the uplink transmission (Msg3), and receives the subsequent downlink transmission Msg4 to complete the contention resolution.

If the MAC RAR type is a two-step random access RAR, the operation proceeds to step 4.

Step 4: For the two-step random access MAC RAR, there are the following branches according to different MAC RAR types indicated by the L field.

A two-step MAC RAR format 1 (FIG. 13*d*) is received. If the UE carries a long UE ID in the random access request of step 1, and the UE ID is consistent with that in the random access request, it is considered that the contention resolution is successful, the UE performs uplink synchronization timing calibration (according to TAC) according to the indication in the MAC RAR, transmits uplink data according to UL Grant, and applies C-RNTI (according to Temporary C-RNTI); and if the UE sends a short UE ID in the random access request or the UE ID is inconsistent with the UE ID in the random access request, it is considered that the random access fails, and the UE may re-initiate a random access attempt subsequently.

A two-step MAC RAR format 2 (FIG. 13*e*) is received. If the UE carries a long UE ID in the random access request of step 1, and the UE ID is consistent with that in the random access request, it is considered that the contention resolution is successful, the UE transmits uplink data (according to the UL Grant) according to the indication in the MAC RAR, and applies C-RNTI (according to Temporary C-RNTI); and if the UE sends a short UE ID in the random access request or the UE ID is inconsistent with the UE ID in the random access request, it is considered that the random access fails, and the UE may re-initiate a random access attempt subsequently.

A two-step MAC RAR format 3 (FIG. 13*f*) is received. If the UE carries a long UE ID in the random access request of step 1, and the UE ID is consistent with that in the random access request, it is considered that the contention resolution is successful, the UE applies C-RNTI (according to Temporary C-RNTI) according to the indication in the MAC RAR, and the operation proceeds to step 5-1; if the UE sends a short UE ID in the random access request or the UE ID is inconsistent with the UE ID in the random access request, it is considered that the random access fails, and the UE may re-initiate a random access attempt subsequently.

A two-step MAC RAR format 4 (FIG. 13*g*) is received. If the UE carries a long UE ID in the random access request of step 1, and the UE ID is consistent with that in the random access request, it is considered that the contention resolution is successful, the UE applies C-RNTI (according to Temporary C-RNTI) according to the indication in the MAC RAR, subsequently receives a PDCCH scheduling command carrying the C-RNTI, and sends an uplink transmission in response to the scheduling command; and if the UE sends a short UE ID in the random access request or the UE ID is inconsistent with the UE ID in the random access request, it is considered that the random access fails, and the UE may re-initiate a random access attempt subsequently. This format is only applicable to a case where the UE sends an uplink transmission in the inactive state, and does not need to obtain the C-RNTI in the connected state.

A two-step MAC RAR format 5 (FIG. 13h) is received. If the UE carries a short UE ID in the random access request of step 1, and the UE ID is consistent with that in the random access request, it is considered that the contention resolution is successful, the UE performs uplink synchronization timing calibration (according to TAC) according to the indication in the MAC RAR, and transmits uplink data according to the UL Grant; and if the UE sends a long UE ID in the random access request or the UE ID is inconsistent with the UE ID in the random access request, it is considered that the random access fails, and the UE may re-initiate a random access attempt subsequently.

A two-step MAC RAR format 6 (FIG. 13i) is received. If the UE carries a short UE ID in the random access request of step 1, and the UE ID is consistent with that in the random access request, it is considered that the contention resolution is successful, and the UE sends uplink data (according to the UL Grant) according to the indication in the MAC RAR; and if the UE sends a long UE ID in the random access request or the UE ID is inconsistent with the UE ID in the random access request, it is considered that the random access fails, and the UE may re-initiate a random access attempt subsequently.

A two-step MAC RAR format 7 (FIG. 13j) is received. If the UE carries a short UE ID in the random access request of step 1, and the UE ID is consistent with that in the random access request, it is considered that the contention resolution is successful, then the UE monitors a PDCCH scheduling command carrying the C-RNTI of the UE; if the PDCCH scheduling command for scheduling the uplink transmission is received, the UE sends the uplink transmission in response to the scheduling command; and if the UE sends a long UE ID in the random access request or the UE ID is inconsistent with the UE ID in the random access request, it is considered that the random access fails, and the UE may re-initiate a random access attempt subsequently. The format is mainly applicable to a case where the UE sends only one uplink transmission in the connected state and no subsequent transmission is required, and the network side does not necessarily send the PDCCH scheduling command subsequently to schedule the uplink transmission.

Based on the same inventive concept, a user equipment (UE) is further provided according to at least one embodiment of the present disclosure. The principle of the UE solving the problem is similar to the random access response method in FIG. 6 according to at least one embodiment of the present disclosure. Therefore, for the implementation of the UE, reference may be made to the implementation of the method, and no repeated description is given herein.

Figure 17:
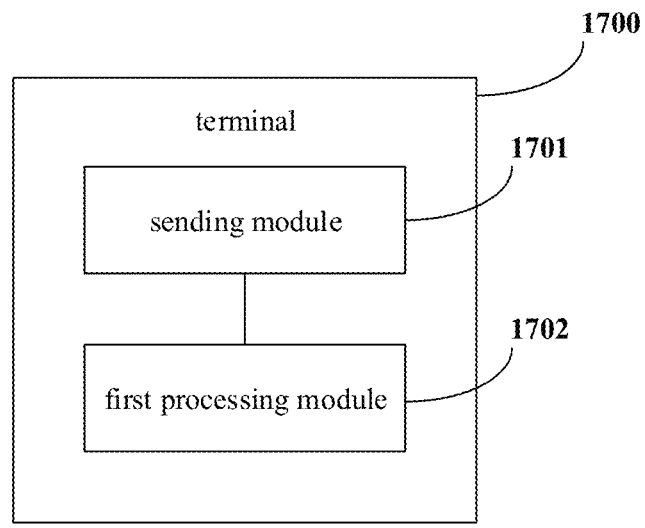
FIG. 17 is a structural block diagram of a user equipment according to at least one embodiment of the present disclosure.

Referring to FIG. 17, a user equipment (UE) is shown. The UE 1700 includes:

a sending module 1701, configured to send a random access request, wherein information including a UE identifier is carried in the random access request; and a first processing module 1702, configured to receive a random access response; wherein when UE identifier carried in the random access response is consistent with the UE identifier in the random access request, a contention resolution is completed; when the UE identifier carried in the random access response is inconsistent with the UE identifier in the random access request, the UE determines that the random access fails this time, and re-initiates a random access attempt; and when no UE identifier is carried in the random access response, the UE falls back to a random access process in which no UE identifier information is carried in the random access request;

wherein the random access response is adaptively generated by a network side in response to the random access request.

A random access that a UE identifier is carried in the random access request is called a two-step random access, and a random access that no UE identifier is carried in the random access request is called a four-step random access.

In at least one embodiment of the present disclosure, optionally, the random access response is sent by using a medium access control protocol data unit (MAC PDU), the MAC PDU includes a MAC header and MAC RARs, the MAC header includes multiple MAC sub-headers, each MAC sub-header includes a random access preamble identifier (RAPID), which corresponds to a random access preamble in the random access request, each MAC sub-header corresponds to one MAC RAR, and a random access response MAC RAR carrying the UE identifier and a random access response MAC RAR carrying no UE identifier are multiplexed into one MAC PDU.

In at least one embodiment of the present disclosure, optionally, a two-step random access and different random access scenarios for the two-step random access, MAC RARs with the same length are used, and the length of MAC RAR is fixed to be capable of including a maximum UE identifier length and a temporary cell radio network temporary identifier (Temporary C-RNTI), or to be capable of including a maximum UE identifier length, a Temporary C-RNTI and an uplink scheduling grant (UL Grant).

In at least one embodiment of the present disclosure, optionally, the MAC RAR includes any one or more of the following:

T1: which indicates a MAC RAR of a four-step random access or a MAC RAR of a two-step random access is subsequent;

T2: which appears only in the MAC RAR of a two-step random access, and is used to indicate a long UE ID or a short UE ID;

Timing Advance Command: uplink timing advance;

UL Grant: resource allocation for subsequent uplink transmission;

Temporary C-RNTI: which is to be converted into a C-RNTI allocated for the UE after the contention resolution is completed;

Contention Resolution Identity: UE identifier information included in the random access request corresponding to two-step random access; and R: reserved bits.

In at least one embodiment of the present disclosure, optionally, the MAC RAR includes all possible fields, each of which has a maximum value of possible lengths, and the length of each field is fixed; and if the field is not needed in the random access response, the field is actually reserved bits filled with a value specified in a protocol or a value determined by the network side.

In at least one embodiment of the present disclosure, optionally, the sending module is further configured to send a preamble of the random access request, and not send information carrying the UE identifier; and the first processing module is further configured to receive the random access response, and determine a MAC sub-header corresponding to the sent preamble according to the RAPID field in the MAC sub-header; wherein the UE acquires a MAC RAR corresponding to the MAC sub-header, and wherein when the indication field in the MAC RAR is analyzed to determine that no UE identifier is carried in the MAC RAR, the UE reads subsequent fields in the MAC RAR, and performs related operations according to the indications of the fields to complete the subsequent random access process; and when the indication field in the MAC RAR is analyzed to determine that the UE identifier is carried in the MAC RAR, the UE determines that the random access fails, and subsequently re-initiates a new random access attempt.

In at least one embodiment of the present disclosure, optionally, the sending module is further configured to send the random access request, which includes a preamble and information including the UE identifier;

the first processing module is further configured to receive the random access response, and determine a MAC sub-header corresponding to the sent preamble according to the RAPID field in the MAC sub-header; and acquire the MAC RAR corresponding to the MAC sub-header; wherein when the indication field T1 in the MAC RAR is analyzed to determine that no UE identifier is carried in the MAC RAR, the UE determines that only the preamble is received by the network side and no data part is correctly received, reads the subsequent fields in the MAC RAR, falls back to the four-step random access, analyzes each field in the MAC RAR according to the four-step random access process, and then completes the subsequent random access process according to the indications of the fields in the MAC RAR; or when the indication field T1 in the MAC RAR is analyzed to determine that the UE identifier is carried in the MAC RAR, and the indication field T2 is analyzed to determine that the UE identifier is a long UE ID, and when the UE sends a long UE ID, the UE determines whether the UE identifier in the MAC RAR is consistent with the long UE ID sent by the UE; when the UE identifier in the MAC RAR is consistent with the long UE ID sent by the UE, the UE determines that a contention resolution is completed, the UE receives a physical downlink control channel (PDCCH) scheduling command with the Temporary C-RNTI subsequently sent by the network side, and sends an uplink transmission in response to the scheduling command; and when the UE identifier in the MAC RAR is inconsistent with the long UE ID sent by the UE, the UE determines that the random access fails this time, and subsequently re-initiates a random access attempt; or when the indication field T1 in the MAC RAR is analyzed to determine that the UE identifier is carried in the MAC RAR, and the indication field T2 is analyzed to determine that the UE identifier is a long UE ID, and when the UE sends a short UE ID, the UE determines that the MAC RAR is not for the UE itself and the random access fails this time, and the UE subsequently re-initiates a random access attempt; or when the indication field T1 in the MAC RAR is analyzed to determine that the UE identifier is carried in the MAC RAR, and the indication field T2 is analyzed to determine that the UE identifier is a short UE ID, and when the UE sends a long UE ID, the UE determines that the MAC RAR is not for the UE itself and the random access fails this time, and the UE subsequently re-initiates a random access attempt; or when the indication field T1 in the MAC RAR is analyzed to determine that the UE identifier is carried in the MAC RAR, and the indication field T2 is analyzed to determine that the UE identifier is a short UE ID, and when the UE sends a short UE ID, the UE determines whether the UE identifier in the MAC RAR is consistent with the short UE ID sent by the UE; when the UE identifier in the MAC RAR is consistent with the short UE ID sent by the UE, the UE determines a contention resolution is completed, the UE analyzes an UL Grant in the MAC RAR, and sends a subsequent uplink transmission according to a resource indicated by the UL Grant in the MAC RAR; and when the UE identifier in the MAC RAR is inconsistent with the short UE ID sent by the UE, the UE determines that the random access fails this time, and subsequently re-initiates a random access attempt.

In at least one embodiment of the present disclosure, optionally, the sending module is further configured to send the random access request, which includes a preamble and information including a UE ID; and the first processing module is further configured to receive the random access response, and determine a MAC sub-header corresponding to the sent preamble according to the RAPID field in the MAC sub-header; and acquire a MAC RAR corresponding to the MAC sub-header; wherein when the indication field T1 in the MAC RAR is analyzed to determine that no UE identifier is carried in the MAC RAR, the UE determines that only the preamble is received by the network side and no data part is correctly received, the UE only analyzes the Timing Advance Command, UL Grant, and Temporary C-RNTI fields in the MAC RAR, falls back to the four-step random access, then adjusts an uplink timing advance according to the indications of the fields in the MAC RAR, acquires Temporary C-RNTI, sends Msg3 according to the UL Grant and completes the subsequent random access process; or when the indication field T1 in the MAC RAR is analyzed to determine that the UE identifier is carried in the MAC RAR, and the indication field T2 is analyzed to determine that the UE identifier is a long UE ID, the UE analyzes all fields; when the UE sends a long UE ID, the UE determines whether the UE identifier in the MAC RAR is consistent with the long UE ID sent by the UE; when the UE identifier in the MAC RAR is consistent with the long UE ID sent by the UE, the UE determines that a contention resolution is completed, then the UE sends a subsequent uplink transmission according to a resource indicated by the UL Grant in the MAC RAR; and when the UE identifier in the MAC RAR is inconsistent with the long UE ID sent by the UE, the UE determines that the random access fails this time, and subsequently re-initiates a random access attempt; or when the indication field T1 in the MAC RAR is analyzed to determine that the UE identifier is carried in the MAC RAR, and the indication field T2 is analyzed to determine that the UE identifier is a long UE ID, the UE analyzes all fields; and when the UE sends a short UE ID, the UE determines that the MAC RAR is not for the UE itself and the random access fails this time, and the UE subsequently re-initiates a random access attempt; or when the indication field T1 in the MAC RAR is analyzed to determine that the UE identifier is carried in the MAC RAR, and the indication field T2 is analyzed to determine that the UE identifier is a short UE ID, the UE analyzes all fields; when the UE sends a long UE ID, the UE determines that the MAC RAR is not for the UE itself and the random access fails this time, and the UE subsequently re-initiates a random access attempt; or when the indication field T1 in the MAC RAR is analyzed to determine that the UE identifier is carried in the MAC RAR, and the indication field T2 is analyzed to determine that the UE identifier is a short UE ID, the UE analyzes all fields; when the UE sends a short UE ID, the UE determines whether the UE identifier in the MAC RAR is consistent with the short UE ID sent by the UE; when the UE identifier in the MAC RAR is consistent with the short UE ID sent by the UE, the UE determines that a contention resolution is completed, then the UE sends a subsequent uplink transmission according to a resource indicated by the UL Grant in the MAC RAR; and when the UE identifier in the MAC RAR is inconsistent with the short UE ID sent by the UE, the UE determines that the random access fails this time, and subsequently re-initiates a random access attempt.

In at least one embodiment of the present disclosure, optionally, the MAC sub-header includes a preamble ID and a length indication field L, and wherein the length indication field L is used to indicate a length or a type of corresponding MAC RAR.

In at least one embodiment of the present disclosure, optionally, the type of MAC RAR includes any one or more of the following:

a four-step random access (4-step RA) MAC RAR format 1: applicable to a scenario where the UE initiates a four-step contention random access;

a four-step random access MAC RAR format 2: applicable to a scenario where the UE initiates a four-step non-contention random access;

a four-step random access MAC RAR format 3: applicable to a scenario where the UE initiates a four-step non-contention random access, and the network side determines that the UE only needs to perform synchronization and does not need to send uplink data;

a two-step random access MAC RAR format 1: a radio resource control (RRC) connection establishment or RRC connection reestablishment on a common control channel CCCH or an inactive UE identifier (UE ID) is carried in the random access request, the network side needs to allocate C-RNTI for the UE, and the network side needs the UE to perform uplink synchronization calibration;

a two-step random access (2-step RA) MAC RAR format 2: the RRC connection establishment or the RRC connection reestablishment on the CCCH channel or the inactive UE ID is carried in the random access request, the network side needs to allocate C-RNTI for the UE, and the network side does not need the UE to perform the uplink synchronization calibration;

a two-step random access MAC RAR format 3: the RRC connection establishment or the RRC connection reestablishment on the CCCH channel or the inactive UE ID is carried in the random access request, the network side needs to allocate C-RNTI for the UE, and the network side does not need the UE to perform the uplink synchronization calibration;

a two-step random access MAC RAR format 4: the inactive UE ID is carried in the random access request, and the network side only confirms that the data in the random access request is received, and does not need the UE to be in a connected state;

a two-step random access MAC RAR format 5: C-RNTI of the UE in the connected state is carried in the random access request, and the network side needs the UE to perform uplink synchronization calibration;

a two-step random access MAC RAR format 6: C-RNTI of the UE in the connected state is carried in the random access request, and the network side does not need the UE to perform uplink synchronization calibration; and a two-step random access MAC RAR format 7: C-RNTI of the UE in the connected state is carried in the random access request, the network side confirms that the data content in the random access request is correctly received, and determines that the UE does not need subsequent uplink transmission, and the network side does not allocate an UL Grant.

In at least one embodiment of the present disclosure, optionally, the sending module is further configured to send a preamble of the random access request, and not send information carrying a UE identifier; and the first processing module is further configured to receive the random access response, determine a MAC sub-header corresponding to the sent preamble according to the RAPID field in the MAC sub-header, and analyze an L field in the MAC sub-header to determine a length or a type of subsequent MAC RAR;

wherein when the L field indicates the type of the MAC RAR of the two-step random access, the UE determines that the random access response is not for the UE itself and the random access fails, and subsequently re-initiates a new random access attempt; and when the L field indicates the type of the MAC RAR of the four-step random access, the UE acquires the MAC RAR, and completes the required subsequent random access process according to the indications of the fields of the MAC RAR.

In at least one embodiment of the present disclosure, optionally, the sending module is further configured to send the random access request, which includes a preamble and a UE identifier; and the first processing module is further configured to receive the random access response, determine a MAC sub-header corresponding to the sent preamble according to the RAPID field in the MAC sub-header, and analyze the L field in the MAC sub-header to determine a type of subsequent MAC RAR;

wherein when the MAC RAR type is a four-step random access RAR, the UE determines that the data part in the random access request is not correctly received by the network side, falls back to the four-step random access process, sends an Msg3 according to the MAC RAR indication, and receives a downlink transmission Msg4 to complete the contention resolution;

when the MAC RAR type is a two-step random access RAR, the following processing is performing according to different MAC RAR types indicated by the L field:

in a case that the format type is the two-step random access MAC RAR format 1, when a long UE ID is carried in the random access request, and the UE identifier in the MAC RAR is consistent with the long UE ID in the random access request, it is considered by the UE that the contention resolution is successful, and the UE performs uplink synchronization timing calibration, sends uplink data, and applies C-RNTI according to the indication in the MAC RAR; and when the UE sends a short UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 2, when a long UE ID is carried in the random access request, and the UE identifier in the MAC RAR is consistent with the long UE ID in the random access request, it is considered by the UE that the contention resolution is successful, and the UE sends uplink data and applies C-RNTI according to the indication in the MAC RAR; and when the UE sends a short UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 3, when a long UE ID is carried in the random access request, and the UE identifier in the MAC RAR is consistent with the long UE ID in the random access request, it is considered by the UE that the contention resolution is successful, and the UE applies C-RNTI according to the indication in the MAC RAR; and when the UE sends a short UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 4, when a long UE ID is carried in the random access request, and the UE identifier in the MAC RAR is consistent with the long UE ID in the random access request, it is considered by the UE that the contention resolution is successful, and the UE applies C-RNTI according to the indication in the MAC RAR, then receives a PDCCH scheduling command carrying the C-RNTI and sends uplink transmission in response to the scheduling command; and when the UE sends a short UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 5, when a short UE ID is carried in the random access request, and the UE identifier in the MAC RAR is consistent with the short UE ID in the random access request, it is considered by the UE that the contention resolution is successful, and the UE performs uplink synchronization timing calibration and sends uplink data according to the indication in the MAC RAR; and when the UE sends a long UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 6, when a short UE ID is carried in the random access request, and the UE identifier in the MAC RAR is consistent with the short UE ID in the random access request, it is considered by the UE that the contention resolution is successful, and the UE sends uplink data according to the indication in the MAC RAR; and when the UE sends a long UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 7, when a short UE ID is carried in the random access request, and the UE identifier in the MAC RAR is consistent with the short UE ID in the random access request, it is considered by the UE that the contention resolution is successful, then the UE monitors a PDCCH scheduling command carrying the C-RNTI, and once receiving a PDCCH scheduling command for scheduling uplink transmission, the UE sends uplink transmission in response to the scheduling command; and when the UE sends a long UE ID in the random access request or when the UE identifier in the MAC RAR is inconsistent with the UE identifier in the random access request, it is considered by the UE that the random access fails, and the UE subsequently re-initiates a random access attempt.

Based on the same inventive concept, a network side device is further provided according to at least one embodiment of the present disclosure. The principle of the network side device solving the problem is similar to the contention random access method shown in FIG. 7 according to at least one embodiment of the present disclosure. Therefore, for the implementation of the network side device, reference may be made to the implementation of the method, and no repeated description is given herein.

Figure 18:
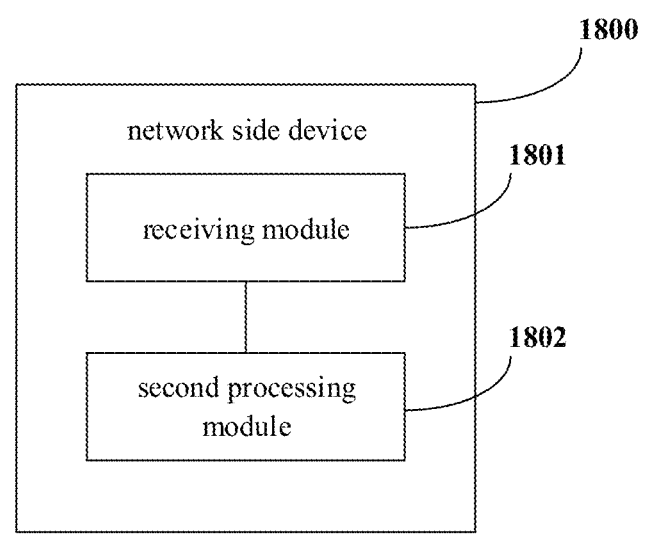
FIG. 18 is a structural block diagram of a network side device according to at least one embodiment of the present disclosure.

Referring to FIG. 18, a network side device is shown. The network side device 1800 includes:

a receiving module 1801 configured to receive a random access request sent by a user equipment (UE), wherein information including a UE identifier is carried in the random access request; and a second processing module 1802 configured to adaptively generate a random access response in response to the random access request, and send the random access response to the UE; wherein if the information including a UE identifier (ID) is carried in the random access request, the UE ID information is included in the random access response according to the two-step random access process; and if no information including a UE identifier is carried in the random access request, a random access response is generated according to the four-step random access.

In at least one embodiment of the present disclosure, optionally, the random access response is sent by using a MAC PDU, the MAC PDU includes a MAC header and medium access control random access responses (MAC RARs), the MAC header includes multiple MAC sub-headers, each MAC sub-header includes a RAPID, which corresponds to a preamble in the random access request, each MAC sub-header corresponds to one MAC RAR, and a random access response MAC RAR carrying the UE identifier and a random access response MAC RAR carrying no UE identifier are multiplexed into one MAC PDU.

In at least one embodiment of the present disclosure, optionally, for a four-step random access, a two-step random access and different random access scenarios for the two-step random access, MAC RARs with the same length are used, and the length of MAC RAR is fixed to be capable of including a maximum UE ID length and a Temporary C-RNTI, or to be capable of including a maximum UE ID length, a Temporary C-RNTI and an UL Grant.

In at least one embodiment of the present disclosure, optionally, the MAC RAR includes any one or more of the following:

T1: which indicates a MAC RAR of a four-step random access or a MAC RAR of a two-step random access is subsequent;

T2: which appears only in the MAC RAR of a two-step random access, and is used to indicate a long UE ID or a short UE ID;

Timing Advance Command: uplink timing advance;

UL Grant: resource allocation for subsequent uplink transmission;

Temporary C-RNTI: which is to be converted into a C-RNTI allocated for the UE after the contention resolution is completed;

Contention Resolution Identity: UE identifier information included in the request corresponding to two-step random access; and R: reserved bits.

In at least one embodiment of the present disclosure, optionally, the MAC RAR includes all possible fields, each of which has a maximum value of possible lengths, and the length of each field is fixed; and if the field is not needed in the random access response, the field is actually reserved bits filled with a value specified in a protocol or a value determined by the network side.

In at least one embodiment of the present disclosure, optionally, the receiving module is further configured to receive a random access request, wherein the random access request includes a preamble and does not send information carrying the UE identifier, and the second processing module is further configured to send a random access response, wherein the random access response includes an uplink timing advance, an uplink transmission resource, and a Temporary C-RNTI configured for the UE according to the preamble.

In at least one embodiment of the present disclosure, optionally, the receiving module is further configured to receive a random access request, wherein the random access request includes a preamble or includes a preamble and a data part; and the second processing module is further configured to generate and send a corresponding MAC RAR to the UE in response to the received random access request.

In at least one embodiment of the present disclosure, optionally, when the indication field T1 in the generated MAC RAR determines that the UE identifier is carried in the MAC RAR, and the indication field T2 determines that the UE identifier is a long UE ID, the network side sends a PDCCH scheduling command that carries Temporary C-RNTI, and allocates subsequent uplink transmission resources to the UE.

In at least one embodiment of the present disclosure, optionally, the MAC sub-header includes a preamble ID and a length indication field L, and wherein the length indication field L is used to indicate a length or a type of corresponding MAC RAR.

In at least one embodiment of the present disclosure, optionally, the type of MAC RAR includes any one or more of the following:

a four-step random access MAC RAR format 1: applicable to a scenario where the UE initiates a four-step contention random access;

a four-step random access MAC RAR format 2: applicable to a scenario where the UE initiates a four-step non-contention random access;

a four-step random access MAC RAR format 3: applicable to a scenario where the UE initiates a four-step non-contention random access, and the network side determines that the UE only needs to perform synchronization and does not need to send uplink data;

a two-step random access MAC RAR format 1: a RRC connection establishment or RRC connection reestablishment on a CCCH or an inactive UE ID is carried in the random access request, the network side needs to allocate C-RNTI for the UE, and the network side needs the UE to perform uplink synchronization calibration;

a two-step random access MAC RAR format 2: the RRC connection establishment or the RRC connection reestablishment on the CCCH channel or the inactive UE ID is carried in the random access request, the network side needs to allocate C-RNTI for the UE, and the network side does not need the UE to perform the uplink synchronization calibration;

a two-step random access MAC RAR format 3: the RRC connection establishment or the RRC connection reestablishment on the CCCH channel or the inactive UE ID is carried in the random access request, the network side needs to allocate C-RNTI for the UE, and the network side does not need the UE to perform the uplink synchronization calibration;

a two-step random access MAC RAR format 4: the inactive UE ID is carried in the random access request, and the network side only confirms that the data in the random access request is received, and does not need the UE to be in a connected state;

a two-step random access MAC RAR format 5: C-RNTI of the UE in the connected state is carried in the random access request, and the network side needs the UE to perform uplink synchronization calibration;

a two-step random access MAC RAR format 6: C-RNTI of the UE in the connected state is carried in the random access request, and the network side does not need the UE to perform uplink synchronization calibration; and a two-step random access MAC RAR format 7: C-RNTI of the UE in the connected state is carried in the random access request, the network side confirms that the data content in the random access request is correctly received, and determines that the UE does not need subsequent uplink transmission, and the network side does not allocate an UL Grant.

If the UE identifier carried in the random access response is consistent with the UE identifier in the random access request, the UE completes the contention resolution; if the UE identifier carried in the random access response is inconsistent with the UE identifier in the random access request, the UE determines that the random access fails this time, and re-initiates a random access attempt; and if no UE identifier is carried in the random access response, the UE falls back to a random access process (four-step random access, also called 4-step RA) in which no UE identifier information is carried in the random access request. Therefore, not only a unified process is ensured, but also the UE is capable of obtaining a correct feedback in cases of different random access purposes and types. Meanwhile, due to the use of the unified process and the adaptive MAC RAR, when the UE initiates a two-step random access, if an expected feedback is not received in the random access response, the UE may fall back to the four-step random access.

It is to be understood that the expression "one embodiment" or "an embodiment" mentioned throughout this specification means that particular features, structures, or characteristics related to the embodiments may be included in at least one embodiment of the present disclosure. Therefore, "in one embodiment" or "in an embodiment" appeared in the whole specification do not necessarily refer to the same embodiment. In addition, these particular features, structures, or characteristics may be combined in any suitable manner in one or more embodiments.

In various embodiments of the present disclosure, it should be understood that the serial numbers of the above processes does not mean the order of execution, and the order of execution for the processes should be determined by their functions and internal logic, and should be not restrictive of the implementation processes of the embodiments of the present disclosure.

Additionally, the terms "system" and "network" may be used interchangeably herein.

It should be understood that the term "and/or" in this context is merely an association describing the associated objects, which indicates that there may be three relationships. For example, A and/or B may indicate three cases that A exists separately, A and B exist simultaneously, and B exists separately. In addition, the character "/" in this context generally indicates that the contextual objects have an "or" relationship.

In the embodiments of the present disclosure, it should be understood that "B corresponding to A" means that B is associated with A, and B may be determined based on A. However, it should also be understood that determining B based on A does not mean that B is only determined based on A, and B may also be determined based on A and/or other information.

In the several embodiments provided by the present disclosure, it should be understood that the disclosed method and device may be implemented in other manners. For example, the device embodiments described above are merely illustrative. For example, the division of the units is only a division in terms of logical function. In actual implementation, there may also be other division manners; for example, multiple units or components may be combined or integrated into another system, or some features can be omitted or not executed. In addition, the mutual coupling or direct coupling or communication connection as shown or discussed may be an indirect coupling or communication connection through some interfaces, devices or units, and may be in electrical, mechanical or other forms.

In addition, individual functional units in various embodiments of the present disclosure may be integrated into one processing unit, or individual units may be physically included separately, or two or more units may be integrated into one unit. The above integrated unit can be implemented in the form of hardware or in the form of hardware plus software functional units.

The above described integrated unit implemented in the form of a software functional unit can be stored in a computer readable storage medium. The software functional unit is stored in a storage medium which includes a plurality of instructions for causing a computer device (which may be a personal computer, a server, or a network device, etc.) to execute all or part of the steps of the methods of the various embodiments of the present disclosure. The foregoing storage medium includes: a U disk, a mobile hard disk, a Read-Only Memory (ROM), a Random Access Memory (RAM), a magnetic disk or an optical disk, and various media that can store program codes thereon.

Described above are preferred embodiments of the present disclosure, and it should be noted that those skilled in the art can also make several improvements and modifications without departing from the principles of the present disclosure, which will also fall within the scope of protection of the present disclosure.

What is claimed is:

1. A method for responding to a random access, comprising:
   a user equipment (UE) sending a random access request, wherein information comprising a UE identifier is carried in the random access request; and
   the UE receiving a random access response, wherein when a UE identifier carried in the random access response is consistent with the UE identifier in the random access request, a contention resolution is completed; when the UE identifier carried in the random access response is inconsistent with the UE identifier in the random access request, the UE determines that the random access fails this time, and re-initiates a random access attempt; and when no UE identifier is carried in the random access response, the UE falls back to a random access process in which no UE identifier information is carried in the random access request;
   wherein the random access response is generated by a network side in response to the random access request;
   wherein the random access response is sent by using a medium access control protocol data unit (MAC PDU), the MAC PDU comprises a MAC header and MAC RARs, the MAC header comprises multiple MAC sub-headers, one of the MAC sub-headers comprises a random access preamble identifier (RAPID) field, which corresponds to a random access preamble in the random access request, each MAC sub-header corresponds to one MAC RAR, and a random access response MAC RAR carrying the UE identifier and a random access response MAC RAR carrying no UE identifier are multiplexed into one MAC PDU.

2. The method according to claim 1, wherein for a four-step random access, a two-step random access and different random access scenarios for the two-step random access, MAC RARs with a same length are used, and the length of the MAC RARs is fixed to be capable of comprising a maximum UE identifier length and a temporary cell radio network temporary identifier (Temporary C-RNTI), or to be capable of comprising a maximum UE identifier length, a Temporary C-RNTI and an uplink scheduling grant (UL Grant).

3. The method according to claim 1, wherein the MAC RARs comprise any one or more of the following:
   T1: which indicates a MAC RAR of a four-step random access or a MAC RAR of a two-step random access is subsequent;
   T2: which appears only in the MAC RAR of a two-step random access, and is used to indicate a long UE ID or a short UE ID;
   Timing Advance Command: uplink timing advance;
   UL Grant: resource allocation for subsequent uplink transmission;
   Temporary C-RNTI: which is to be converted into a C-RNTI allocated for the UE after the contention resolution is completed;
   Contention Resolution Identity: UE identifier information comprised in the random access request corresponding to two-step random access; and
   R: reserved bits.

4. The method according to claim 1, wherein each MAC RAR comprises any combination of fields that support a random access process, each of which has a maximum value of available lengths, and the length of each field is fixed; and if any field is not needed in the random access response, the field is actually reserved bits filled with a value specified in a protocol or a value determined by the network side.

5. The method according to claim 2, wherein based on the UE falling back to a random access process in which no UE identifier information is carried in the random access request, the method further includes:

the UE sending a preamble of the random access request, and not sending information carrying the UE identifier; and the UE receiving the random access response, and determining a MAC sub-header corresponding to the sent preamble according to the RAPID field in the MAC sub-header; and the UE acquiring a MAC RAR corresponding to the MAC sub-header; wherein when an indication field in the MAC RAR is analyzed to determine that no UE identifier is carried in the MAC RAR, the UE reads subsequent fields in the MAC RAR, and performs related operations according to indications of the subsequent fields to complete a subsequent random access process; and when the indication field in the MAC RAR is analyzed to determine that the UE identifier is carried in the MAC RAR, the UE determines that the random access fails, and subsequently re-initiates a new random access attempt.

6. The method according to claim 2, wherein
the UE sending a random access request comprises:
   the UE sending the random access request, which comprises a preamble and information comprising the UE identifier;
the UE receiving a random access response comprises:
   the UE receiving the random access response, and determining a MAC sub-header corresponding to the sent preamble according to the RAPID field in the MAC sub-header; and
   the UE acquiring a MAC RAR corresponding to the MAC sub-header; wherein when an indication field T1 in the MAC RAR is analyzed to determine that no UE identifier is carried in the MAC RAR, the UE determines that only the preamble is received by the network side and no data part is correctly received, reads subsequent fields in the MAC RAR, falls back to the four-step random access, analyzes each field in the MAC RAR according to the four-step random access process, and then completes a subsequent random access process according to indications of the subsequent fields in the MAC RAR; or
   when the indication field T1 in the MAC RAR is analyzed to determine that the UE identifier is carried in the MAC RAR, and an indication field T2 is analyzed to determine that the UE identifier is a long UE ID, and when the UE sends a long UE ID, the UE determines whether the UE identifier in the MAC RAR is consistent with the long UE ID sent by the UE; when the UE identifier in the MAC RAR is consistent with the long UE ID sent by the UE, the UE determines that a contention resolution is completed, the UE receives a physical downlink control channel (PDCCH) scheduling command with the Temporary C-RNTI subsequently sent by the network side, and sends an uplink transmission in response to the scheduling command; and when the UE identifier in the MAC RAR is inconsistent with the long UE ID sent by the UE, the UE determines that the random access fails this time, and subsequently re-initiates a random access attempt; or
when the indication field T1 in the MAC RAR is analyzed to determine that the UE identifier is carried in the MAC RAR, and the indication field T2 is analyzed to determine that the UE identifier is a long UE ID, and when the UE sends a short UE ID, the UE determines that the MAC RAR is not for the UE itself and the random access fails this time, and the UE subsequently re-initiates a random access attempt; or when the indication field T1 in the MAC RAR is analyzed to determine that the UE identifier is carried in the MAC RAR, and the indication field T2 is analyzed to determine that the UE identifier is a short UE ID, and when the UE sends a long UE ID, the UE determines that the MAC RAR is not for the UE itself and the random access fails this time, and the UE subsequently re-initiates a random access attempt; or when the indication field T1 in the MAC RAR is analyzed to determine that the UE identifier is carried in the MAC RAR, and the indication field T2 is analyzed to determine that the UE identifier is a short UE ID, and when the UE sends a short UE ID, the UE determines whether the UE identifier in the MAC RAR is consistent with the short UE ID sent by the UE; when the UE identifier in the MAC RAR is consistent with the short UE ID sent by the UE, the UE determines a contention resolution is completed, the UE analyzes an UL Grant in the MAC RAR, and sends a subsequent uplink transmission according to a resource indicated by the UL Grant in the MAC RAR; and when the UE identifier in the MAC RAR is inconsistent with the short UE ID sent by the UE, the UE determines that the random access fails this time, and subsequently re-initiates a random access attempt.

7. The method according to claim 4, wherein
the UE sending a random access request comprises:
   the UE sending the random access request, which comprises a preamble and information comprising a UE ID;
the UE receiving a random access response comprises:
   the UE receiving the random access response, and determining a MAC sub-header corresponding to the sent preamble according to the RAPID field in the MAC sub-header; and
   the UE acquiring a MAC RAR corresponding to the MAC sub-header; wherein when the indication field T1 in the MAC RAR is analyzed to determine that no UE identifier is carried in the MAC RAR, the UE determines that only the preamble is received by the network side and no data part is correctly received, the UE only analyzes Timing Advance Command, UL Grant, and Temporary C-RNTI fields in the MAC RAR, falls back to a four-step random access, then adjusts an uplink timing advance according to indications of the fields in the MAC RAR, acquires Temporary C-RNTI, sends Msg3 according to the UL Grant and completes a subsequent random access process; or
   when the indication field T1 in the MAC RAR is analyzed to determine that the UE identifier is carried in the MAC RAR, and an indication field T2 is analyzed to determine that the UE identifier is a long UE ID, the UE analyzes all fields; when the UE sends a long UE ID, the UE determines whether the UE identifier in the MAC RAR is consistent with the long UE ID sent by the UE; when the UE identifier in the MAC RAR is consistent with the long UE ID sent by the UE, the UE determines that a contention resolution is completed, then the UE sends a subsequent uplink transmission according to a resource indicated by the UL Grant in the MAC RAR; and when the UE identifier in the MAC RAR is inconsistent with the long UE ID sent by the UE, the UE determines that the random access fails this time, and subsequently re-initiates a random access attempt; or when the indication field T1 in the MAC RAR is analyzed to determine that the UE identifier is carried in the MAC RAR, and the indication field T2 is analyzed to determine that the UE identifier is a long UE ID, the UE analyzes all fields; and when the UE sends a short UE ID, the UE determines that the MAC RAR is not for the UE itself and the random access fails this time, and the UE subsequently re-initiates a random access attempt; or when the indication field T1 in the MAC RAR is analyzed to determine that the UE identifier is carried in the MAC RAR, and the indication field T2 is analyzed to determine that the UE identifier is a short UE ID, the UE analyzes all fields; when the UE sends a long UE ID, the UE determines that the MAC RAR is not for the UE itself and the random access fails this time, and the UE subsequently re-initiates a random access attempt; or when the indication field T1 in the MAC RAR is analyzed to determine that the UE identifier is carried in the MAC RAR, and the indication field T2 is analyzed to determine that the UE identifier is a short UE ID, the UE analyzes all fields; when the UE sends a short UE ID, the UE determines whether the UE identifier in the MAC RAR is consistent with the short UE ID sent by the UE; when the UE identifier in the MAC RAR is consistent with the short UE ID sent by the UE, the UE determines that a contention resolution is completed, then the UE sends a subsequent uplink transmission according to a resource indicated by the UL Grant in the MAC RAR; and when the UE identifier in the MAC RAR is inconsistent with the short UE ID sent by the UE, the UE determines that the random access fails this time, and subsequently re-initiates a random access attempt.

8. The method according to claim 1, wherein the MAC sub-header comprises a preamble ID and a length indication field L, and wherein the length indication field L is used to indicate a length or a type of corresponding MAC RAR.

9. The method according to claim 8, wherein the type of MAC RAR comprises any one or more of the following:

a four-step random access MAC RAR format 1: applicable to a scenario where the UE initiates a four-step contention random access;

a four-step random access MAC RAR format 2: applicable to a scenario where the UE initiates a four-step non-contention random access;

a four-step random access MAC RAR format 3: applicable to a scenario where the UE initiates a four-step non-contention random access, and the network side determines that the UE only needs to perform synchronization and does not need to send uplink data;

a two-step random access MAC RAR format 1: a radio resource control (RRC) connection establishment or RRC connection reestablishment on a common control channel CCCH or an inactive UE identifier (UE ID) is carried in the random access request, the network side needs to allocate C-RNTI for the UE, and the network side needs the UE to perform uplink synchronization calibration;

a two-step random access MAC RAR format 2: the RRC connection establishment or the RRC connection reestablishment on the CCCH channel or the inactive UE ID is carried in the random access request, the network side needs to allocate C-RNTI for the UE, and the network side does not need the UE to perform the uplink synchronization calibration;

a two-step random access MAC RAR format 3: the RRC connection establishment or the RRC connection reestablishment on the CCCH channel or the inactive UE ID is carried in the random access request, the network side needs to allocate C-RNTI for the UE, and the network side does not need the UE to perform the uplink synchronization calibration;

a two-step random access MAC RAR format 4: the inactive UE ID is carried in the random access request, and the network side only confirms that the data in the random access request is received, and does not need the UE to be in a connected state;

a two-step random access MAC RAR format 5: C-RNTI of the UE in the connected state is carried in the random access request, and the network side needs the UE to perform uplink synchronization calibration;

a two-step random access MAC RAR format 6: C-RNTI of the UE in the connected state is carried in the random access request, and the network side does not need the UE to perform uplink synchronization calibration; and a two-step random access MAC RAR format 7: C-RNTI of the UE in the connected state is carried in the random access request, the network side confirms that the data content in the random access request is correctly received, and determines that the UE does not need subsequent uplink transmission, and the network side does not allocate an UL Grant.

10. The method according to claim 8, wherein based on the UE falling back to a random access process in which no UE identifier information is carried in the random access request, the method further includes:

the UE sending a preamble of the random access request, and not sending information carrying a UE identifier; and the UE receiving the random access response, determining a MAC sub-header corresponding to the sent preamble according to the RAPID field in the MAC sub-header, and analyzing an L field in the MAC sub-header to determine a length or a type of subsequent MAC RAR;

wherein when the L field indicates the type of the MAC RAR of a two-step random access, the UE determines that the random access response is not for the UE itself and the random access fails, and the UE subsequently re-initiates a new random access attempt; and when the L field indicates the type of the MAC RAR of a four-step random access, the UE acquires the MAC RAR, and the UE completes the required subsequent random access process according to indications of the fields of the MAC RAR.

11. The method according to claim 8, wherein the UE sending a random access request comprises:

the UE sending the random access request, which comprises a preamble and a UE identifier; and the UE receiving a random access response comprises:

the UE receiving the random access response, determining a MAC sub-header corresponding to the sent preamble according to the RAPID field in the MAC sub-header, and analyzing the L field in the MAC sub-header to determine a type of subsequent MAC RAR;

wherein when the MAC RAR type is a four-step random access RAR, the UE determines that a data part in the random access request is not correctly received by the network side, falls back to the four-step random access process, sends an Msg3 according to the MAC RAR indication, and receives a downlink transmission Msg4 to complete the contention resolution;

when the MAC RAR type is a two-step random access RAR, the following processing is performing according to different MAC RAR types indicated by the L field:

in a case that a format type is the two-step random access MAC RAR format 1, when a long UE ID is carried in the random access request, and the UE identifier in the MAC RAR is consistent with the long UE ID in the random access request, it is considered by the UE that the contention resolution is successful, and the UE performs uplink synchronization timing calibration, sends uplink data, and applies C-RNTI according to the indication in the MAC RAR; and when the UE sends a short UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 2, when a long UE ID is carried in the random access request, and the UE identifier in the MAC RAR is consistent with the long UE ID in the random access request, it is considered by the UE that the contention resolution is successful, and the UE sends uplink data and applies C-RNTI according to the indication in the MAC RAR; and when the UE sends a short UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 3, when a long UE ID is carried in the random access request, and the UE identifier in the MAC RAR is consistent with the long UE ID in the random access request, it is considered by the UE that the contention resolution is successful, and the UE applies C-RNTI according to the indication in the MAC RAR; and when the UE sends a short UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 4, when a long UE ID is carried in the random access request, and the UE identifier in the MAC RAR is consistent with the long UE ID in the random access request, it is considered by the UE that the contention resolution is successful, and the UE applies C-RNTI according to the indication in the MAC RAR, then receives a PDCCH scheduling command carrying the C-RNTI and sends uplink transmission in response to the scheduling command; and when the UE sends a short UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 5, when a short UE ID is carried in the random access request, and the UE identifier in the MAC RAR is consistent with the short UE ID in the random access request, it is considered by the UE that the contention resolution is successful, and the UE performs uplink synchronization timing calibration and sends uplink data according to the indication in the MAC RAR; and when the UE sends a long UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 6, when a short UE ID is carried in the random access request, and the UE identifier in the MAC RAR is consistent with the short UE ID in the random access request, it is considered by the UE that the contention resolution is successful, and the UE sends uplink data according to the indication in the MAC RAR; and when the UE sends a long UE ID in the random access request or when the UE identifier in the MAC RAR is inconsistent with the UE identifier in the random access request, it is considered by the UE that the random access fails, and the UE subsequently re-initiates a random access attempt; or in a case that the format type is the two-step random access MAC RAR format 7, when a short UE ID is carried in the random access request, and the UE identifier in the MAC RAR is consistent with the short UE ID in the random access request, it is considered by the UE that the contention resolution is successful, then the UE monitors a PDCCH scheduling command carrying the C-RNTI, and once receiving a PDCCH scheduling command for scheduling uplink transmission, the UE sends uplink transmission in response to the scheduling command; and when the UE sends a long UE ID in the random access request or when the UE identifier in the MAC RAR is inconsistent with the UE identifier in the random access request, it is considered by the UE that the random access fails, and the UE subsequently re-initiates a random access attempt.

12. A method for responding to a random access, comprising:

a network side receiving a random access request sent by a user equipment (UE), wherein information comprising a UE identifier is carried in the random access request; and the network side generating a random access response in response to the random access request, and sending the random access response to the UE;

wherein the random access response is sent by using a MAC PDU, the MAC PDU comprises a MAC header and medium access control random access responses (MAC RARs), the MAC header comprises multiple MAC sub-headers, one of the MAC sub-headers comprises a RAPID field, which corresponds to a preamble in the random access request, each MAC sub-header corresponds to one MAC RAR, and a random access response MAC RAR carrying the UE identifier and a random access response MAC RAR carrying no UE identifier are multiplexed into one MAC PDU.

13. The method according to claim 12, wherein for a four-step random access, a two-step random access and different random access scenarios for the two-step random access, MAC RARs with a same length are used, and the length of the MAC RARs is fixed to be capable of comprising a maximum UE ID length and a Temporary C-RNTI, or to be capable of comprising a maximum UE ID length, a Temporary C-RNTI and an UL Grant.

14. The method according to claim 12, wherein the MAC RARs comprise any one or more of the following:
- T1: which indicates a MAC RAR of a four-step random access or a MAC RAR of a two-step random access is subsequent;
- T2: which appears only in the MAC RAR of a two-step random access, and is used to indicate a long UE ID or a short UE ID;
- Timing Advance Command: uplink timing advance;
- UL Grant: resource allocation for subsequent uplink transmission;
- Temporary C-RNTI: which is to be converted into a C-RNTI allocated for the UE after the contention resolution is completed;
- Contention Resolution Identity: UE identifier information comprised in the request corresponding to two-step random access; and
- R: reserved bits.

15. The method according to claim 12, wherein each MAC RAR comprises any combination of fields that support a random access process, each of which has a maximum value of available lengths, and the length of each field is fixed; and if any field is not needed in the random access response, the field is actually reserved bits filled with a value specified in a protocol or a value determined by the network side.

16. The method according to claim 14, wherein based on the UE falling back to a random access process in which no UE identifier information is carried in the random access request, the method further comprises:
- the network side receiving the random access request, wherein the random access request comprises a preamble and does not send information carrying the UE identifier; and
- the network side sending the random access response, wherein the random access response comprises an uplink timing advance, an uplink transmission resource, and a Temporary C-RNTI configured for the UE according to the preamble.

17. The method according to claim 14, wherein
the network side receiving a random access request sent by the UE comprises:
- the network side receiving the random access request, wherein the random access request comprises a preamble or comprises a preamble and a data part; and
the network side generating a random access response in response to the random access request comprises:
- the network side generating and sending a corresponding MAC RAR to the UE in response to the received random access request.

18. The method according to claim 17, wherein based on an indication field T1 in the generated MAC RAR indicating that the UE identifier is carried in the MAC RAR, and an indication field T2 indicating that the UE identifier is a long UE ID, the method further comprise:
- the network side sending a PDCCH scheduling command that carries Temporary C-RNTI, and allocating subsequent uplink transmission resources for the UE.

19. The method according to claim 12, wherein the MAC sub-header comprises a preamble ID and a length indication field L, and wherein the length indication field L is used to indicate a length or a type of corresponding MAC RAR.

20. The method according to claim 19, wherein the type of MAC RAR comprises any one or more of the following:
- a four-step random access MAC RAR format 1: applicable to a scenario where the UE initiates a four-step contention random access;
- a four-step random access MAC RAR format 2: applicable to a scenario where the UE initiates a four-step non-contention random access;
- a four-step random access MAC RAR format 3: applicable to a scenario where the UE initiates a four-step non-contention random access, and the network side determines that the UE only needs to perform synchronization and does not need to send uplink data;
- a two-step random access MAC RAR format 1: a RRC connection establishment or RRC connection reestablishment on a CCCH or an inactive UE ID is carried in the random access request, the network side needs to allocate C-RNTI for the UE, and the network side needs the UE to perform uplink synchronization calibration;
- a two-step random access MAC RAR format 2: the RRC connection establishment or the RRC connection reestablishment on the CCCH channel or the inactive UE ID is carried in the random access request, the network side needs to allocate C-RNTI for the UE, and the network side does not need the UE to perform the uplink synchronization calibration;
- a two-step random access MAC RAR format 3: the RRC connection establishment or the RRC connection reestablishment on the CCCH channel or the inactive UE ID is carried in the random access request, the network side needs to allocate C-RNTI for the UE, and the network side does not need the UE to perform the uplink synchronization calibration;
- a two-step random access MAC RAR format 4: the inactive UE ID is carried in the random access request, and the network side only confirms that the data in the random access request is received, and does not need the UE to be in a connected state;
- a two-step random access MAC RAR format 5: C-RNTI of the UE in the connected state is carried in the random access request, and the network side needs the UE to perform uplink synchronization calibration;
- a two-step random access MAC RAR format 6: C-RNTI of the UE in the connected state is carried in the random access request, and the network side does not need the UE to perform uplink synchronization calibration; and
- a two-step random access MAC RAR format 7: C-RNTI of the UE in the connected state is carried in the random access request, the network side confirms that the data content in the random access request is correctly received, and determines that the UE does not need subsequent uplink transmission, and the network side does not allocate an UL Grant.

21. A user equipment (UE), comprising a processor, a transceiver and a memory,
wherein the processor is configured to read programs in the memory to perform the following process:
sending a random access request, wherein information comprising a UE identifier is carried in the random access request; and
receiving a random access response, wherein when UE identifier carried in the random access response is consistent with the UE identifier in the random access request, a contention resolution is completed; when the UE identifier carried in the random access response is inconsistent with the UE identifier in the random access request, the UE determines that the random access fails this time, and re-initiates a random access attempt; and when no UE identifier is carried in the random access response, the UE falls back to a random access process in which no UE identifier information is carried in the random access request;

wherein the random access response is generated by a network side in response to the random access request;

the transceiver is configured to receive and transmit data; and the memory is configured to store data used by the processor in performing operations;

wherein the random access response is sent by using a medium access control protocol data unit (MAC PDU), the MAC PDU comprises a MAC header and MAC RARs, the MAC header comprises multiple MAC sub-headers, one of the MAC sub-headers comprises a random access preamble identifier (RAPID) field, which corresponds to a random access preamble in the random access request, each MAC sub-header corresponds to one MAC RAR, and a random access response MAC RAR carrying the UE identifier and a random access response MAC RAR carrying no UE identifier are multiplexed into one MAC PDU.

22. A network side device for implementing the method according to claim 12, comprising a processor, a transceiver and a memory, wherein the processor is configured to read programs in the memory to perform the following process:

receiving a random access request sent by a user equipment (UE), wherein information comprising a UE identifier is carried in the random access request; and generating a random access response in response to the random access request, and sending the random access response to the UE, the transceiver is configured to receive and transmit data, and the memory is configured to store data used by the processor in performing operations.

* * * * *